United States Patent [19]
Suh

[11] 3,761,068
[45] Sept. 25, 1973

[54] SHOCK LOAD DISPERSER

[75] Inventor: Nam P. Suh, Sudbury, Mass.

[73] Assignee: The University of South Carolina, Columbia, S.C.

[22] Filed: Oct. 9, 1970

[21] Appl. No.: 79,615

[52] U.S. Cl. .............................. 267/136, 267/166
[51] Int. Cl. ............................................. F16f 7/00
[58] Field of Search .................. 267/136, 137, 168, 267/166

[56] References Cited
UNITED STATES PATENTS

| | | | |
|---|---|---|---|
| 2,916,307 | 12/1959 | Peters | 267/136 |
| 2,001,835 | 5/1935 | Cook | 267/168 |
| 3,426,869 | 2/1969 | Platus et al. | 267/136 |
| 3,445,080 | 5/1969 | Flannelly | 267/136 |

*Primary Examiner*—James B. Marbert
*Attorney*—William D. Stokes

[57] ABSTRACT

Method and apparatus for minimizing or eliminating damage to a system by mechanical impact. The method comprises minimizing the effects of a shock load by propagating the individual Fourier components of the stress waves associated with the load at different velocities over a short distance. The apparatus of the invention comprises a specially arranged or contoured body wherein the surface boundary causes the incident angle of the individual Fourier components to continuously vary over the distance of wave propagation. The method and apparatus is provided for specific uses such as automobile bumpers, automobile dashboards, suspension systems, ship construction, particularly submarines to minimize shock load damage, cargo handling and in building foundation construction to minimize or eliminate shock damage such as by earthquakes.

16 Claims, 48 Drawing Figures

PATENTED SEP 25 1973  3,761,068

INVENTOR
NAM P. SUH

BY *William D. Stokes*
ATTORNEY

INVENTOR
NAM P. SUH

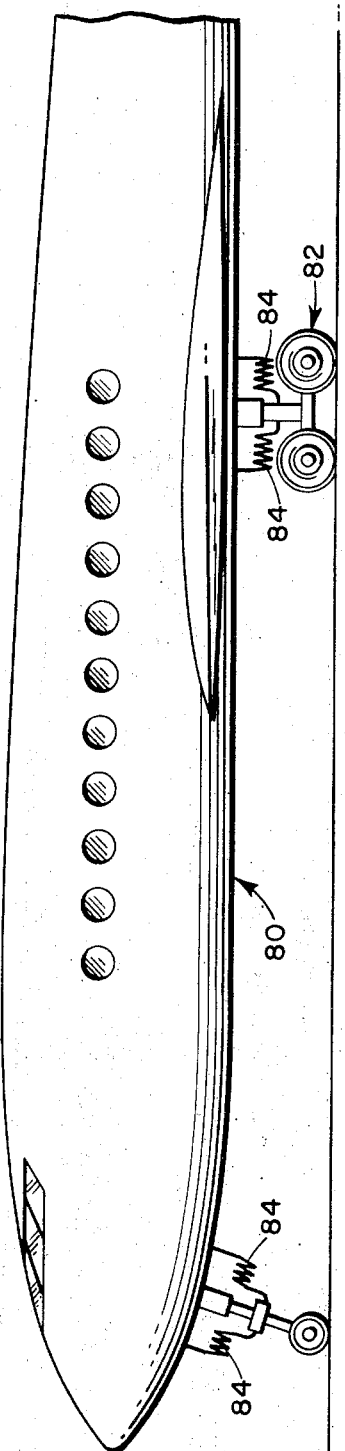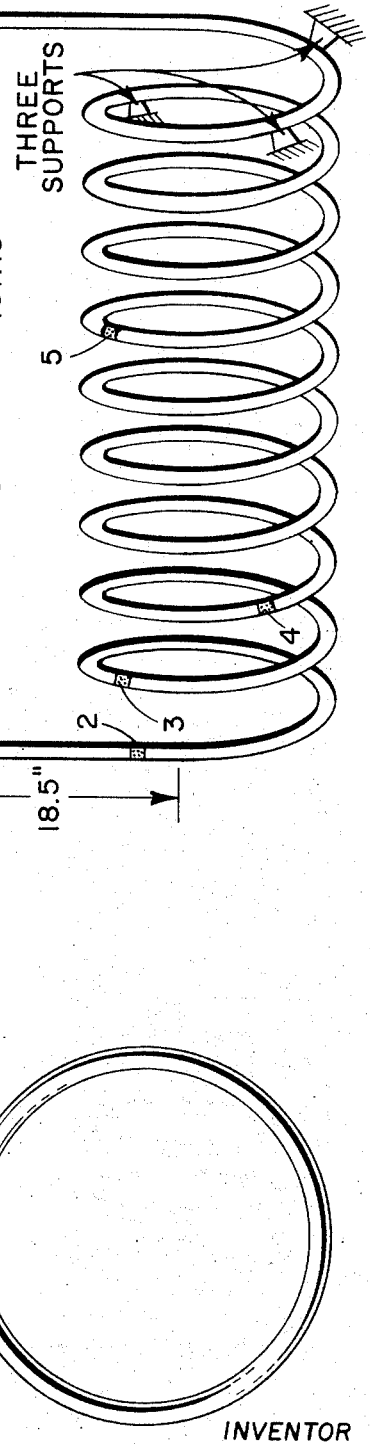

| GAUGE STATION | DISTANCE FROM FIRST STRAIN GAUGE (in inches) | | |
|---|---|---|---|
| | inner | outer | centroid |
| 2 | 6.26 | 6.63 | 6.44 |
| 3 | 11.61 | 14.51 | 13.06 |
| 4 | 20.66 | 26.57 | 26.67 |
| 5 | 45.06 | 59.13 | 52.09 |
| 6 | 81.49 | 102.63 | 92.06 |
| 7 | 104.66 | 128.81 | 116.73 |
| 8A | 126.94 | 154.74 | 140.34 |
| 8B | 128.96 | 155.36 | 142.16 |

INVENTOR
NAM P. SUH

BY William D. Stokes
ATTORNEY 6 in.-LONG HAMMER. LOWER BEAM AMPLIFIED 1.5 TIMES THE UPPER BEAM. SWEEP SPEED = 1×10⁻⁴ sec./cm. (EXCEPT 2×10⁻⁴ sec./cm. FOR FIG. 12e.)

LARGER END OF COIL LOADED. ½ in. DIA. STEEL BALL.
UPPER BEAMS AMPLIFIED 10.5 TIMES. LOWER BEAMS
AMPLIFIED 16.7 TIMES. SWEEP SPEED = $10^{-4}$ sec./cm.

SMALLER END OF COIL LOADED. 4½ in.-LONG HAMMER. UPPER BEAMS AMPLIFIED 10.5 TIMES. LOWER BEAMS AMPLIFIED 16.7 TIMES. SWEEP SPEED = 1×10⁻⁴ sec./cm.

LARGER END OF COIL LOADED. 4½ in.-LONG HAMMER. UPPER BEAMS AMPLIFIED 10.5 TIMES. LOWER BEAMS AMPLIFIED 16.7 TIMES. SWEEP SPEED = $1 \times 10^{-4}$ sec./cm.

SHOCK LOAD DISPERSER

This invention relates to a method and apparatus for lowering or eliminating the amplitude of the force transmitted by a shock or other impact. In particular, the invention is based on the utilization of the dispersive characteristics of stress waves. Dispersion is commonly defined as the dependence of the propagation velocity of stress waves on their frequency. The degree of dispersion depends on the shape of acoustic media as well as on the type of stress waves. For example, torsional waves in a straight rod do not disperse, whereas waves associated with longitudinal and bending modes disperse a great deal. Since acoustic (or stress) waves generated by mechanical impact or noise are comprised of a number of waves with different frequencies, a given impact can be made to disperse by letting it propagate in a specially contoured medium. By making use of this phenomenon the amplitude of a stress wave due to mechanical impact can be decreased a great deal, thus minimizing or eliminating damage to a system.

In the prior art, numerous devices and methods have been known or suggested for protecting or minimizing damage to persons or objects from impact such as brought about by automobile collisions. Among the more well known devices are various spring loaded mechanisms; however, these devices have not been successful, because, for the most part, the devices rely for efficacy on their ability to absorb or reflect shock energy. Moreover, these devices have the added disadvantage of transmitting the momentum generated by impact without change in the force-time curve, i.e., without diminishing the amplitude of the force.

In accordance with the present invention, there is provided a method of construction and a simple, practical and reliable device requiring little, if any, maintenance, which device brings about a dispersion of the energy of impact. The method and apparatus of this invention successfully minimizes or eliminates the effects of impact or shock and the attendant physical damage commonly resulting in automobile collisions, ship collisions and in cargo handling. The inventive method and apparatus involves propagating individual Fourier components of stress waves associated with impact energy at different velocities over short distances by transmission of the energy through a finite body. The finite body selected must be one constructed in such manner that upon receipt of impact the incident angle of the individual wave of the stress, at the surface boundary, will vary continuously over the distance of propagation.

More particularly, the invention relates to a contour means to disperse the momentum of a shock or impact over a longer time period and the method of dispersing stress waves over the contour means in accordance with the maximum ratio of the duration of loading to the length of the coil. An important embodiment of the invention contemplates the use of helical coil means arranged in a novel manner for use in connection with vehicles, ships, buildings and cargo shipping to the end that damage and noises from shock loads are minimized or eliminated.

The important object of the invention is the provision of a method and a simple, practical and easily maintained device for dispersing stress waves associated with impact energy over a short distance.

Another object of the invention is the provision of helical coil means wherein individual Fourier components of stress waves associated with impact energy are propagated.

Still another object of the invention is the provision of an effective method of dispersing stress waves in a specially contoured medium such as a tangentially loaded helical coil.

Another object of the invention is the provision of a method of determining the maximum ratio of the duration of loading a novel helical coil device to the length to provide the most effective minimization of impact energy.

One of the most important objects of the invention is the provision of a method and apparatus for lowering the amplitude of a force transmitted by a shock or other impact utilizing contoured means, such as a tangentially loaded helical coil, in such manner that the momentum of the individual components of a stress wave is dispersed over a longer period of time.

These and other objects of the invention will be more fully understood and appreciated from the following illustrations of embodiments and descriptions of the inventive method and apparatus in which:

FIG. 8 illustrates the mounting of aircraft landing gears by means of the present invention;

FIG. 10 illustrates the method of the invention by means of tangential loading of a helical coil;

FIG. 11 illustrates the method and constant radius helical coil embodiment of the invention;

Figure 21:
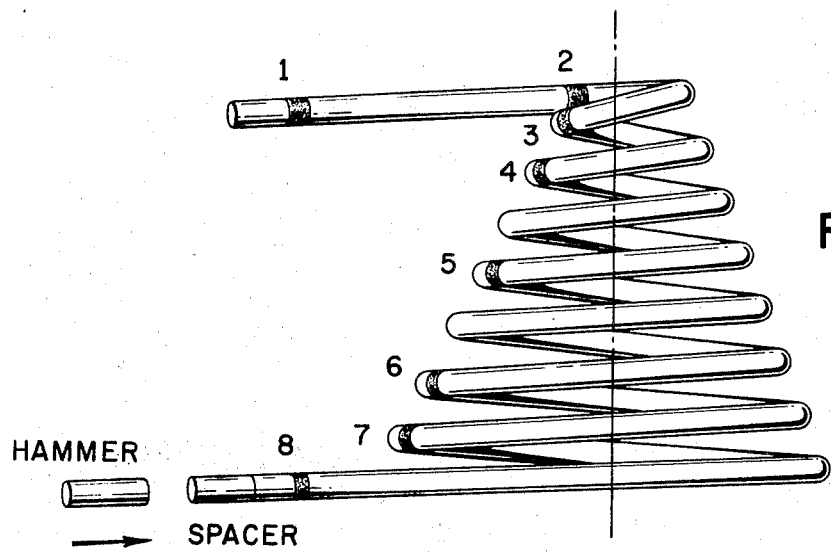
Figure 15:
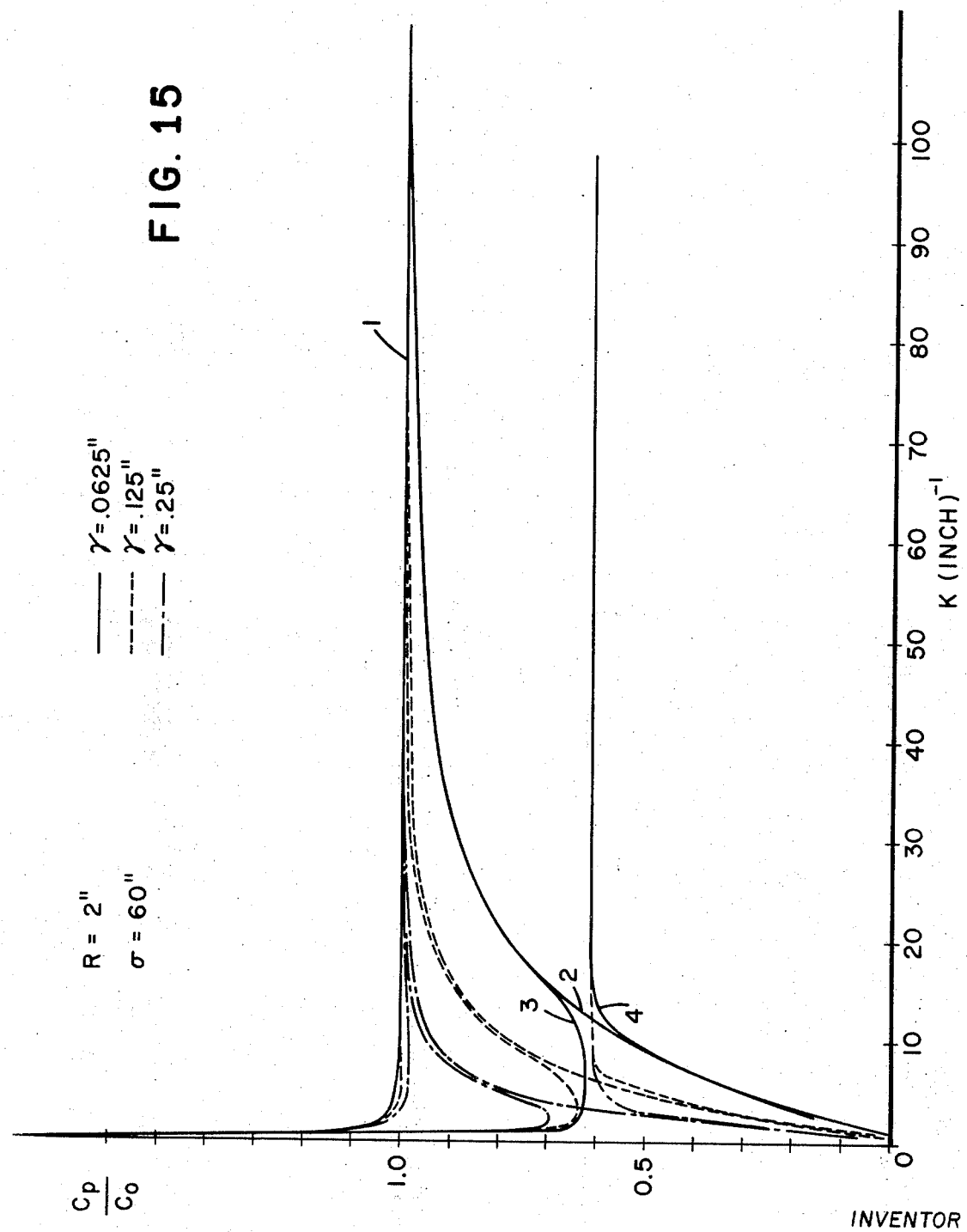
Figure 16:
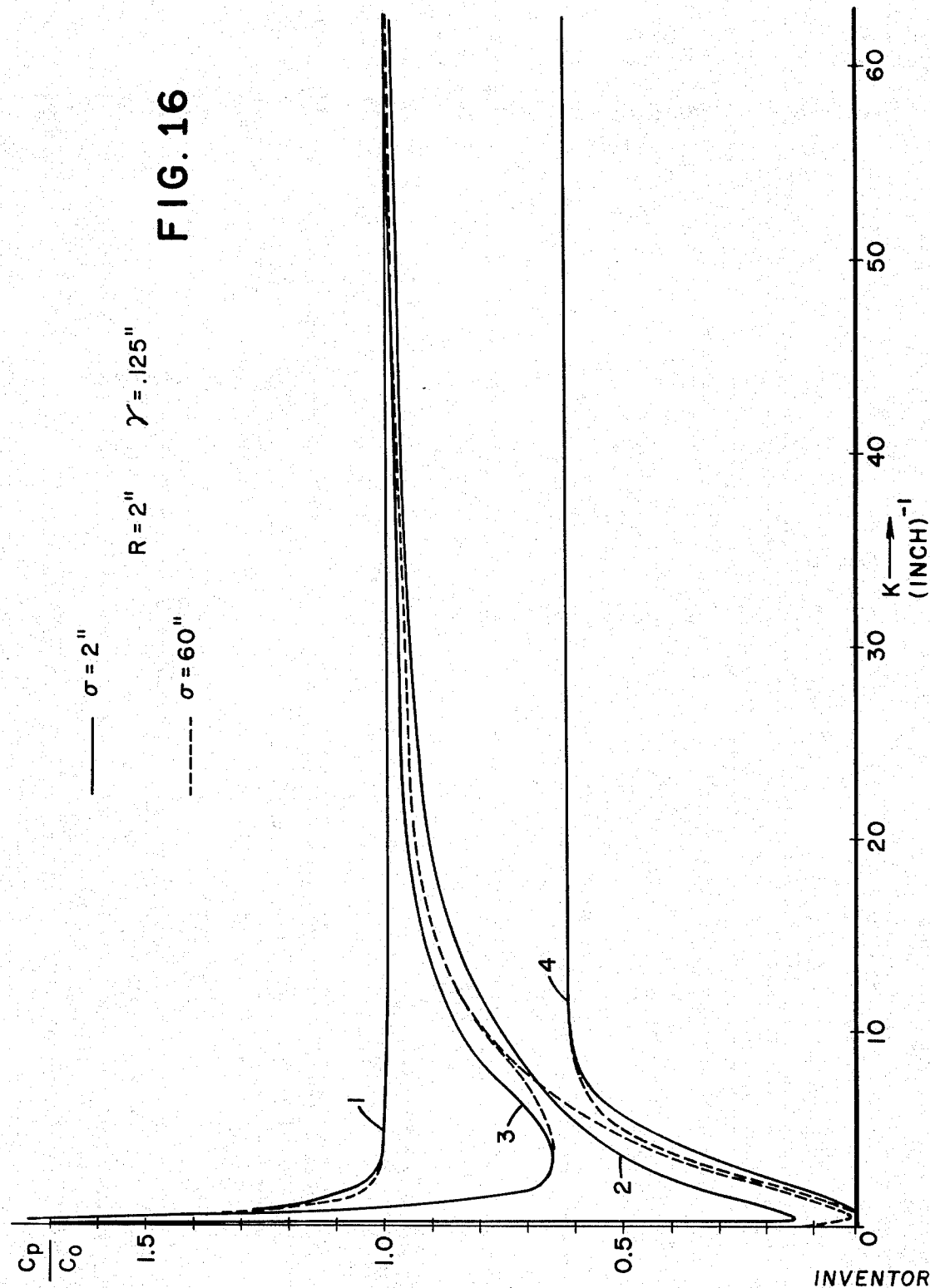
Figure 17:
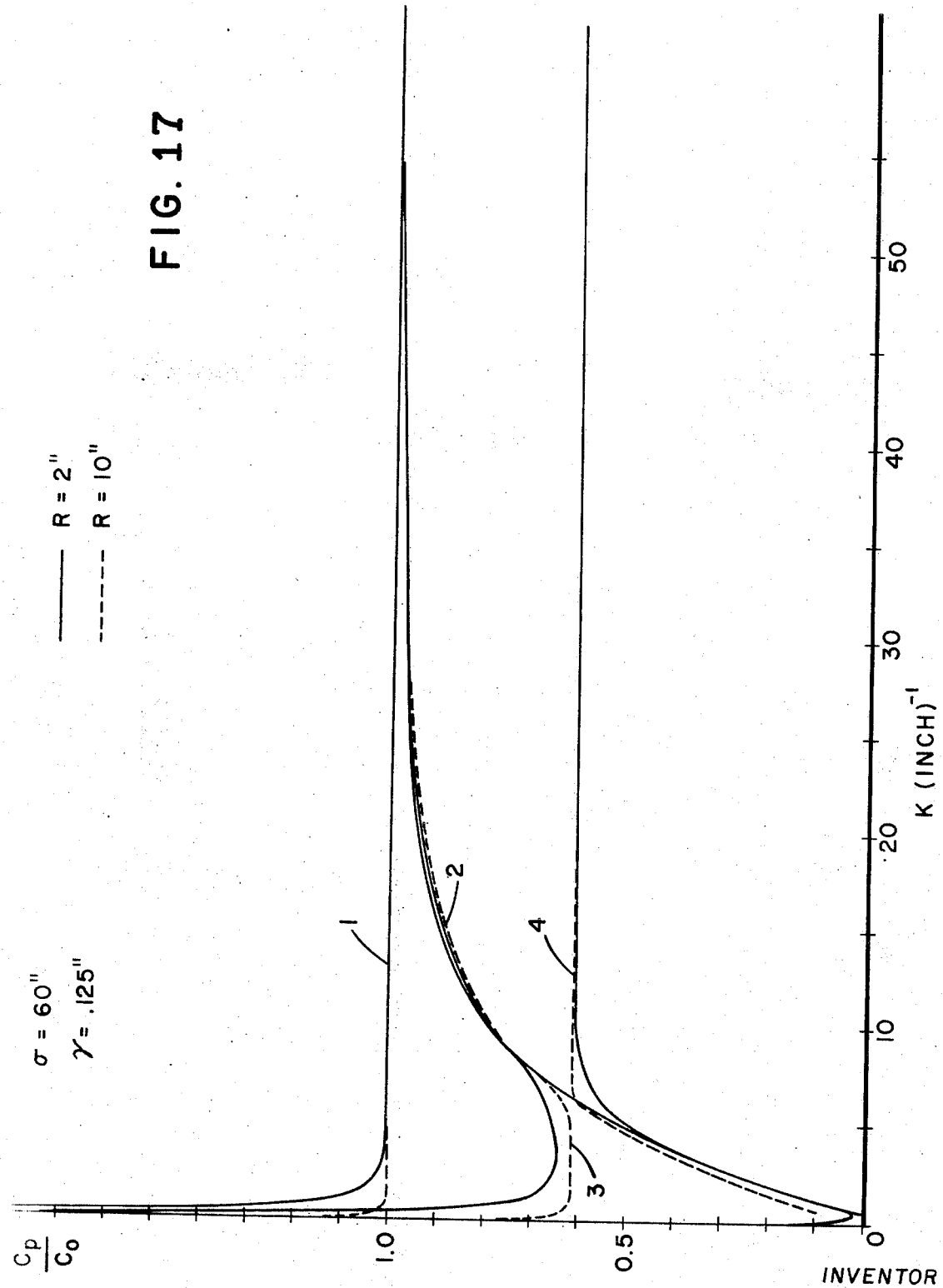
Figure 18:
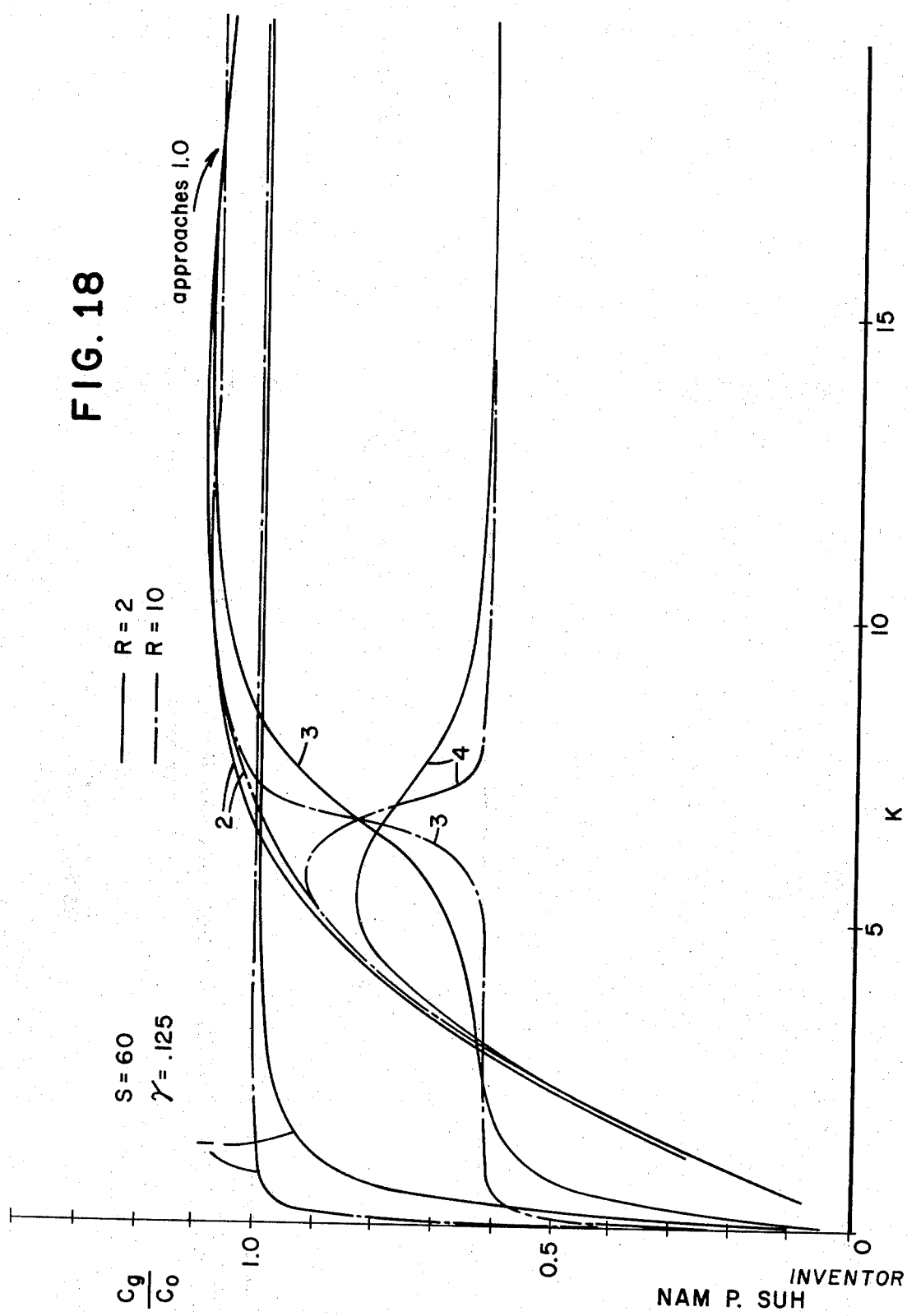
Figure 19:
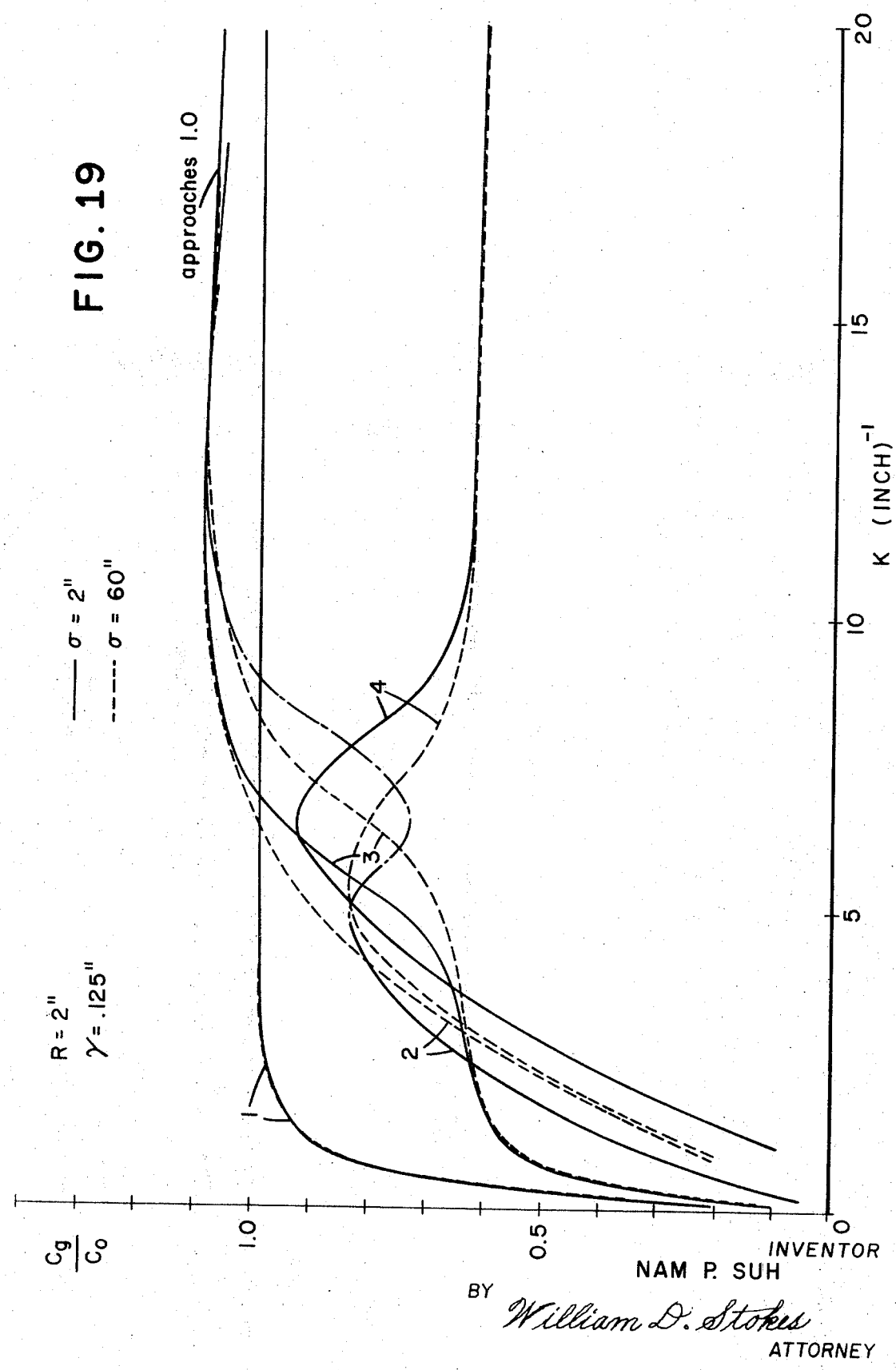
Figure 20:
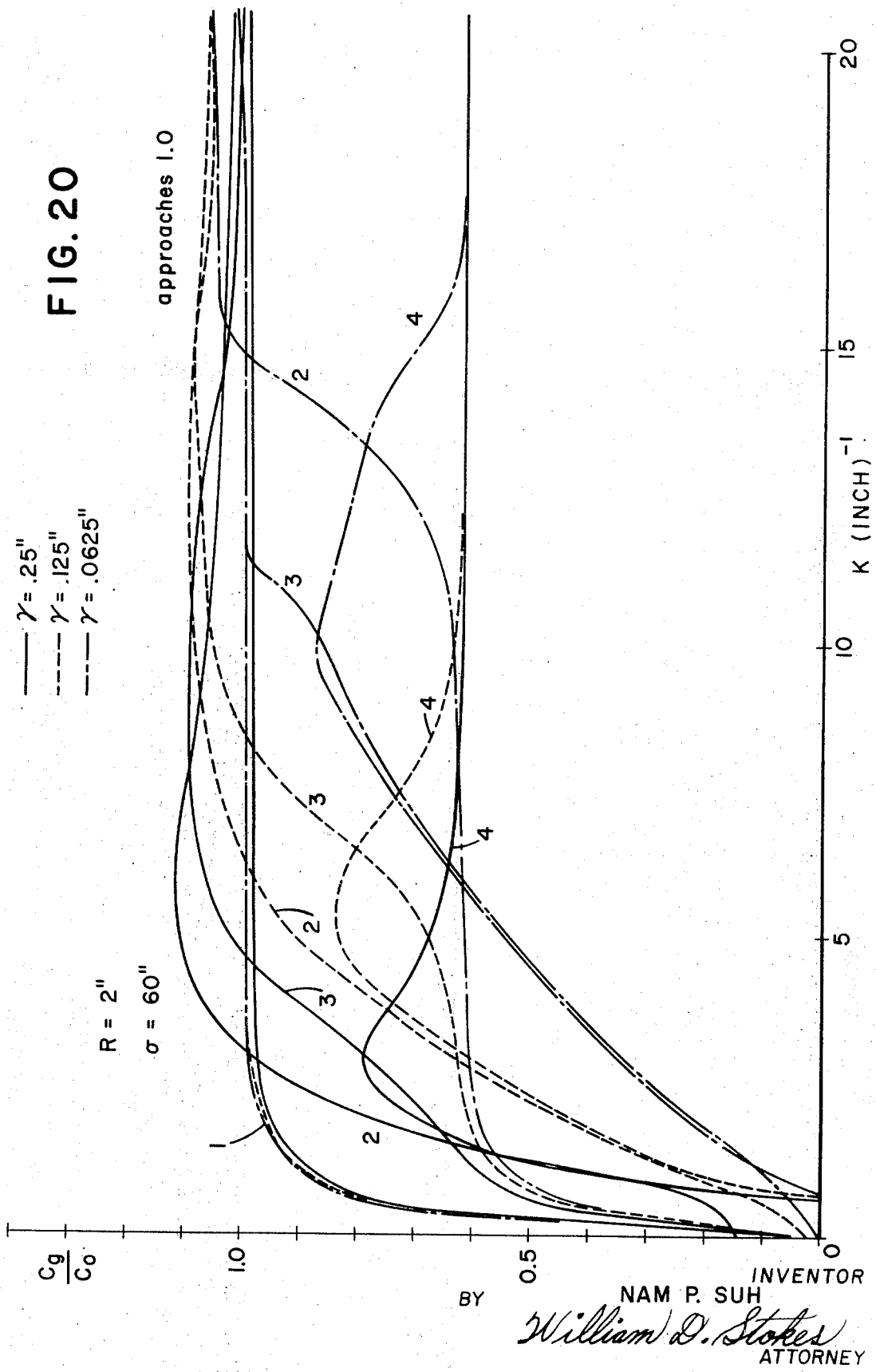

FIGS. 13a–13c patterns for axially mounted gauges at three points obtained with the use of a 4 ½ inch long hammer using the device illustrated in FIG. 11;

FIGS. 14a–14c are patterns for axially mounted gauges at three points obtained with the use of a ½-inch-diameter steel ball using the inventive device illustrated in FIG. 11;

FIG. 15 is a graph of phase velocity versus wave number for various values of radius of gyration;

FIG. 16 is a graph of phase velocity versus wave number for two values of radius of torsion;

FIG. 17 is a graph of phase velocity versus wave number for two values of radius of curvature;

FIG. 18 is a graph of group velocity versus wave number for two values of radius of curvature;

FIG. 19 is a graph of group velocity versus wave number for two values of radius of torsion;

FIG. 20 is a graph of group velocity versus wave numbers for various values of radius of gyration;

FIG. 21 illustrates a varying radius coil embodiment of the invention and the showing of the location of gages for tests made upon the coil;

FIGS. 22a–22e are similar to FIGS. 25a–25e with the load being a ½ inch diameter steel ball;

FIGS. 23a–23e are oscilloscope trace patterns for axially and circumferentially mounted strain gauges in which the operation illustrated in FIG. 21 is conducted with a 4 ½ long cylindrical hammer directed to the smaller end;

FIGS. 24a–24d are similar to FIGS. 23a–23e with the load being a ½ inch diameter steel ball; and FIGS. 25a–25e are oscilloscope trace patterns for axially and circumferentially mounted strain gauges in which the operation illustrated in FIG. 21 is conducted with a 4 ½ inch long cylindrical hammer directed to the larger end.

Referring in more detail to the drawings, there is illustrated in FIGS. 1–11 preferred embodiments of the invention as they may be utilized. It will be readily appreciated that the inventive method and means described may be used wherever a dispersion of impact energy is desired to minimize or eliminate damage or noise.

Figure 1:
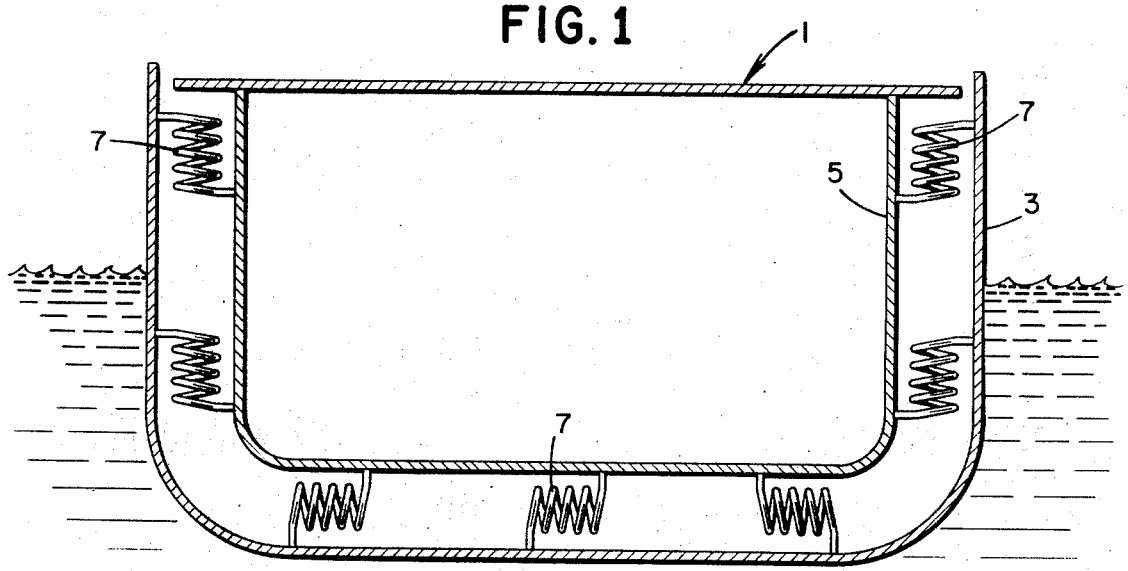
FIG. 1 is an illustration of an embodiment of the invention utilized in connection with the hull and the basic structure of a ship.
Figure 2:
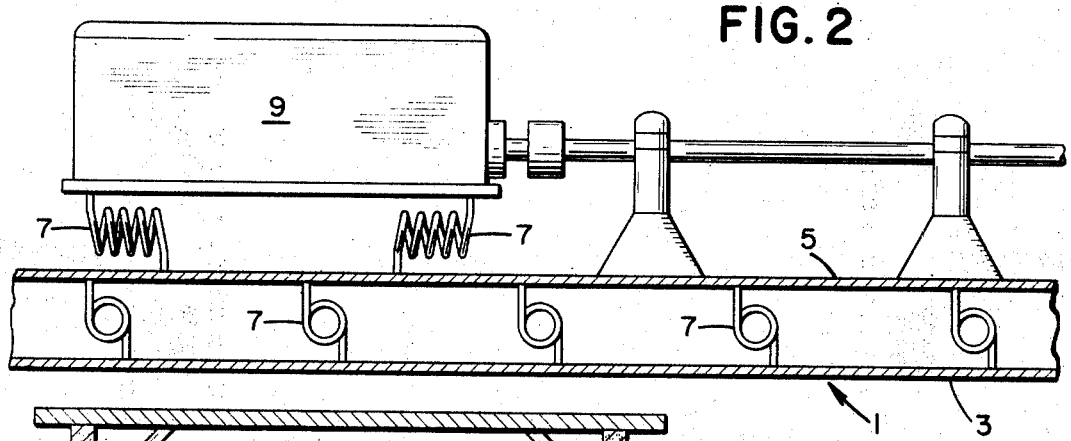
FIG. 2 illustrates the use of an embodiment of the invention for mounting machinery in the ship of FIG. 1 to prevent transmission of noise and vibration from the machinery into the ocean.

Referring particularly to FIGS. 1 and 2 there is depicted a cross-section of a hull 1 of a ship constructed in accordance with the inventive method. It is to be understood that this embodiment may be particularly beneficial in the construction of submarines. In the illustrated embodiment, there is provided an outer hull 3 and an inner hull 5. The structural connection between the inner (3) and outer (5) hulls of the ship is provided by a plurality of tangentially mounted helical coils 7. It will be readily appreciated that by providing means for dispersing shock energy in the illustrated manner, any shock load brought about by, for example, detonation of explosives from within, or without, the ship would be dispersed in such manner that the hull of the ship would not be damaged to the extent of causing the ship to sink.

For the reason that the inventive coil means, by propagating individual Fourier components of the stress waves, acts as an acoustic filter, any noise generated by the ship's machinery can be effectively prevented from being transmitted into the surrounding sea. Referring particularly to FIG. 2 there is illustrated a ship's turbine 9 mounted on deck (inner hull) 5 by means of tangentially attached helical coils 7.

Figure 3:
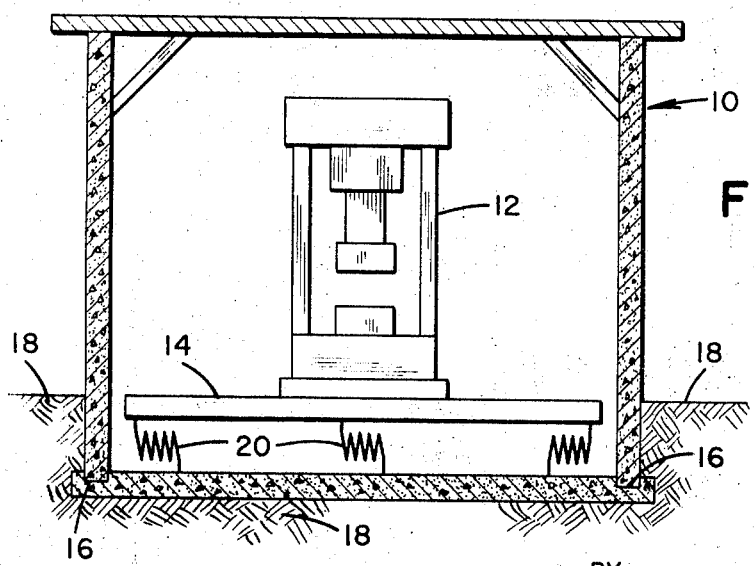
FIG. 3 illustrates the suspension of the floor of a building in such manner as to disperse stress waves from the machinery.
Figure 4:
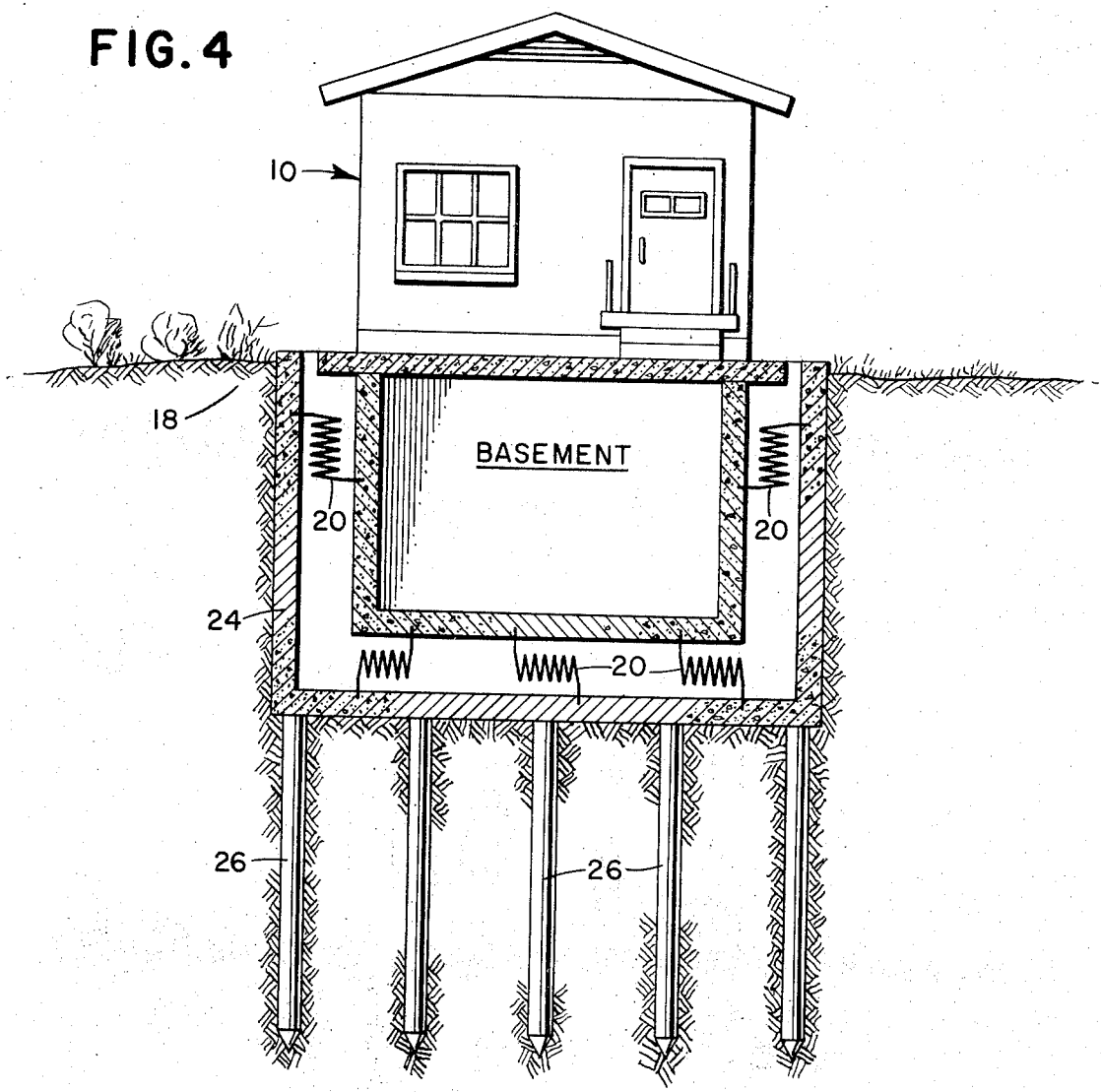
FIG. 4 is an illustration of a building with its foundation mounted on an embodiment of the invention in such manner as to disperse shock energy from, for example, earth tremors, and isolate machinery vibration from the building walls.

Any proper design for a building will take into consideration the problem of transmitted shock to the building from the surrounding earth and of isolation of shock loads and noise from a building to its surroundings. In the first situation, there is particular concern in earthquake prone areas and the latter problem usually arises when the building is employed as a factory where reciprocating or rotating machines are used. In this circumstance the floor may be isolated as shown in FIG. 3. In the illustration, high impact machinery 12, such as a large press, is shown housed in building 10 mounted on floor 14. Floor 14, while within building 10 is structurally separated therefrom. Building 10 has a footing 16 which extends into and is supported by earth 18. Machinery supporting floor 14 is mounted within the building by means of a plurality of helical springs 20 tangentially attached to floor 14 and footing 16.

Where it is desired that an entire building be isolated, possibly for protection against earth tremors, a foundation may be constructed in accordance with this invention as shown in FIG. 4. In this illustrated embodiment building 10 is integral with a basement 22. The walls of basement 22 are supported by a plurality of helical springs 20 tangentially mounted between footings 24 and piles 26.

Figure 5:
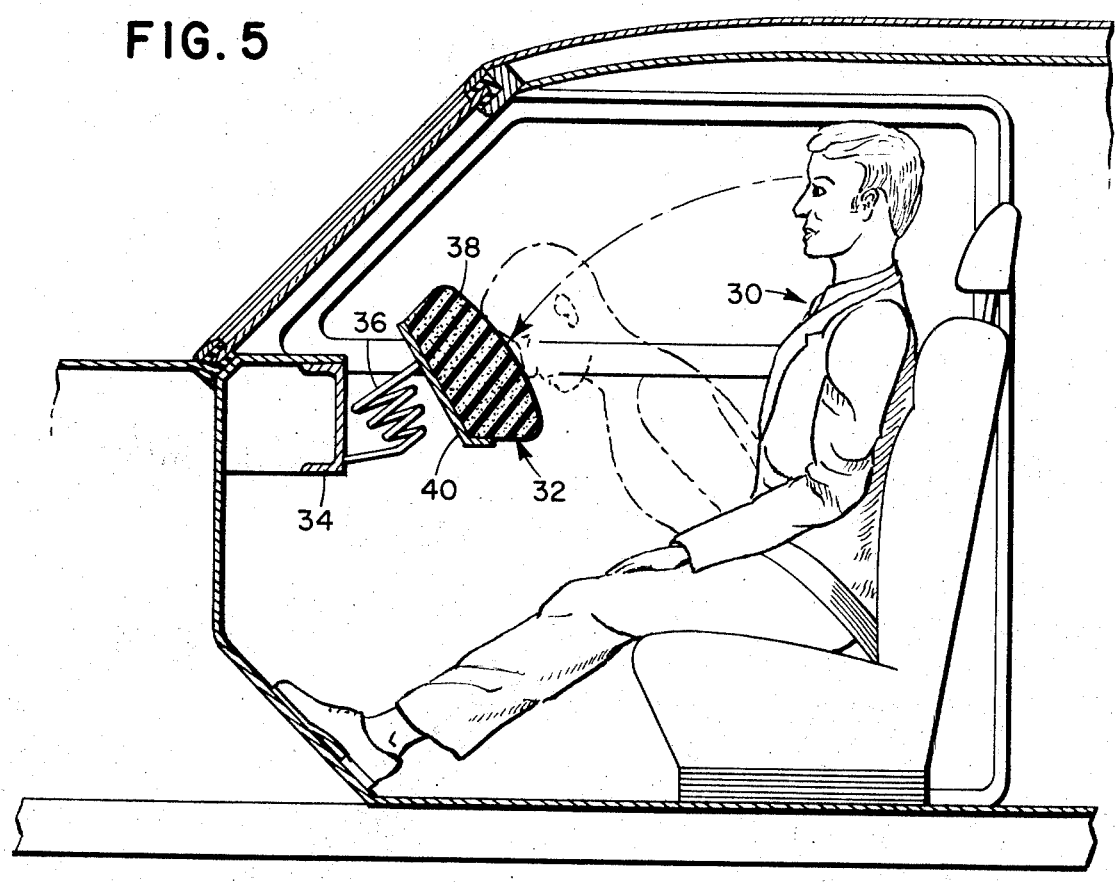
FIG. 5 illustrates an embodiment of the invention used in the mounting of the dashboard of an automobile whereby impact loads are filtered out and largely rejected.

FIG. 5 illustrates the mounting of a dashboard for enhanced safety in a conventional automobile environment. A passenger or operator 30 when normally seated is positioned away from the dashboard 32, which is mounted to the vehicle frame 34 through one or more springs 36. In the illustrated embodiment, a spring 36 of varying radius is provided with the straight end from the small side tangentially attached to frame 34 and that from the large side attached to the dashboard 32. Dashboard 32 is made up of a framed front part 38 with an aluminum backing 40. In operation, impact forces transmitted from frame 34, such as occur in an accidental collision, are dispersed in large part by the small end of coil 36. In addition, impact of an occupant 30 against the dashboard finds a yieldable contact since the dashboard is supported by the end of spring 36 have a large radius.

Figure 6:
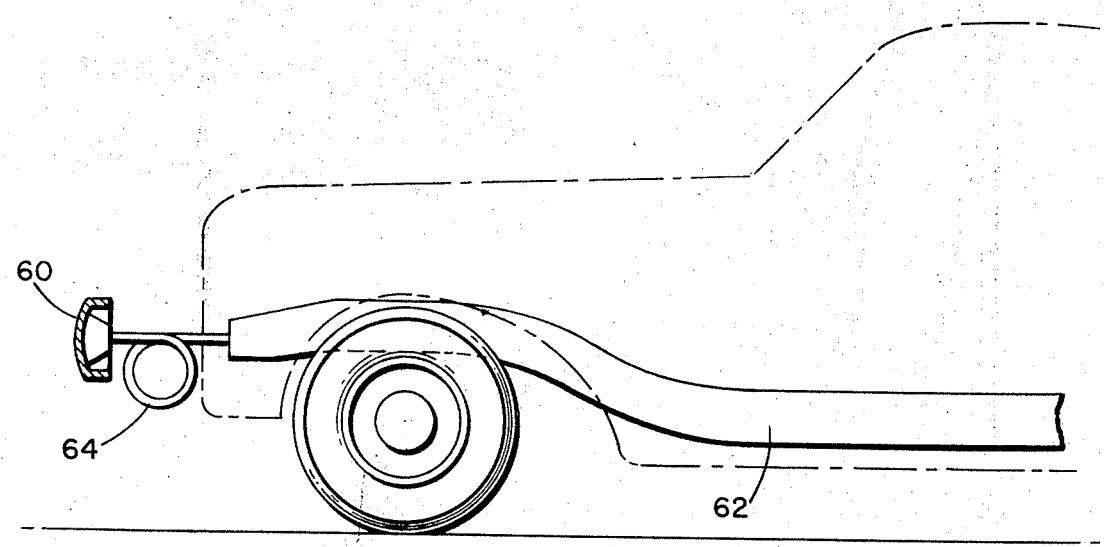
FIG. 6 shows an embodiment of the invention utilized in construction of an automobile bumper.

FIG. 6 illustrates an automobile bumper mounted in accordance with this invention. A conventional bumper 60 is mounted to the conventional frame 62 of an automobile solely by one or more helical springs 64, mounted with one end tangentially connected to bumper 60 and the opposite end tangentially connected to frame 62.

Figure 7:
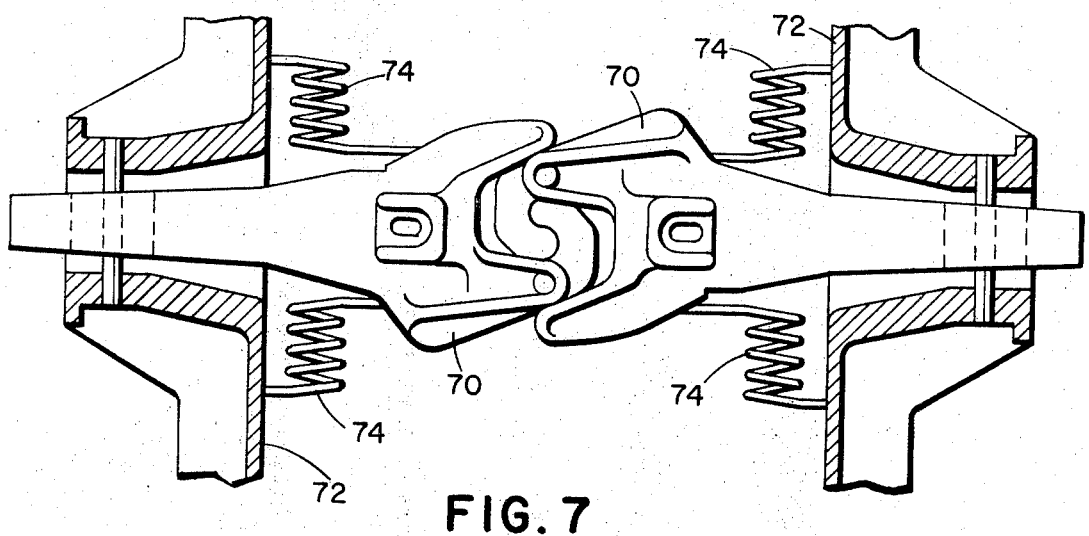
FIG. 7 depicts the suspension mounting of railroad car couplers utilizing an embodiment of the invention.

FIG. 7 illustrates railroad car couplers mounted in accordance with this invention. A conventional coupler 70 is mounted to the car frame 72 solely by one or more helical springs 72, mounted with one end tangentially connected to the connector 70 and the opposite end tangentially connected to car 72.

The drawing illustrates the connection of two cars. In operation, the system will materially minimize jolts so commonly experienced by cargo and passengers in trains.

FIG. 8 is an illustration of the system of this invention as installed on aircraft. In operation, the invention will disperse the heavy impacts occurring during landing. The aircraft body frame 80 is connected to a wheel assembly 82 through two of the tangentially attached helical springs 84, one on each side of wheel assembly 82.

Figure 9:
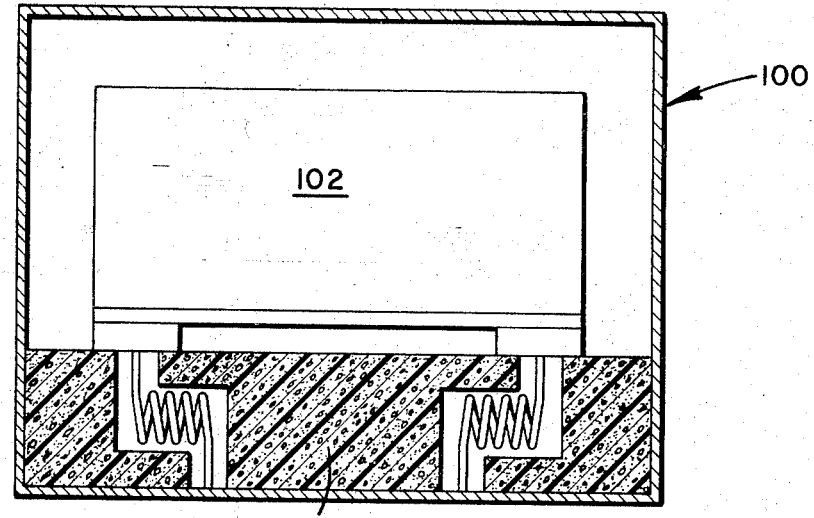
FIG. 9 illustrates a cargo box or container, having a mounting in accordance with this invention for cargo to protect against damage in handling and transit.

A container or box for material in transit is illustrated in FIG. 9. Protection of cargo against damage from impact and the like is, of course, of great significance and economic importance.

In the illustrated embodiment a crate 100 holds cargo 102 for shipment. Two or more tangentially loaded helical coil springs 104 connect the cargo 102 to the bottom of crate 100. Also on the bottom of crate 100 is a layer 106 of foamed rubber or other resilient material.

Tangentially loaded helical coil members 104 may also be imbedded therein. After the members 104 disperse the shock load minimizing any shock damage, the layer 106 absorbs the remainder of the load.

The invention takes advantage of the well known principal that a given stress wave or pulse unless it is purely sinusoidal, can be decomposed into many sinusoidal components through the Fourier analysis. These sinusoidal components are known and referred to as Fourier components of a given pulse or wave.

An illustration of the concept of this invention is shown in FIG. 10. An impulse of varying duration is applied tangentially to the helical coil means. It was discovered that when the coil has straight sections at each end and the impulse is applied at one end, and the stress pulse is incident upon the curved section, the pulse cannot continue along the coil with its original linear pulse if conservation of momentum is to be satisfied. The shape of the pulse changes as it is partially reflected from the lateral surface.

By way of theory of what happens in the coil means of the invention is to recall that in solids an incident distortional wave can generate dilatational and distortional waves upon reflection. Similarly, an incident dilatational wave may generate distortional and dilatational reflected waves, the angles of reflection of which depend on the incident angle and the material properties of the wave guide. When a distortional wave is incident upon a free boundary, there may not be any dilatational component reflected if the incident angle exceeds a critical value. The geometry of the inventive device is such that the incident angle to the lateral surface varies continuously along its length. As a consequence, a pulse traveling in the device will disperse. It is important to note, however, that if a purely twisting moment is applied to the end of the coil, the distortional wave generated in this case is such that it travels down the coil without any dispersion. This is the case with the usual axially loaded helical spring.

It was unexpectedly discovered that a tangentially loaded helical coil acts as an impact load disperser by lowering the amplitude of the pulse and by increasing the pulse length. This concept has not been considered by others.

The invention establishes that for certain applications, helical coils, when tangentially loaded, disperse stress pulses and provides a method for eliminating or substantially minimizing damages due to shock load or impact. The test results discussed hereinafter will amply illustrate the invention. The results were evaluated using the results of an approximate theoretical analysis of stress wave propagation in an infinite coil. The exact mathematical analysis of the experimental results is difficult, but a qualitative understanding of the experimental results can be obtained from the analysis.

For a clearer understanding of the invention the letters and symbols used hereinafter to describe the invention are defined as follows:

A = cross-sectional area of rod
$a$ = radius of coil projected onto plane perpendicular to its axis
B = function defined in text
$C_o$ = bar velocity – $(E/p)^{1/2}$
$C_g$ = group velocity
$C_p$ = phase velocity
$C_s$ = shear wave velocity $(G/p)^{1/2}$
C = torsional rigidity
$c$ = elevation constant – $h/2$
E = Young's modulus
F = force along axis indicated by subscripts
$f$ = frequency
G = shear modulus
$h$ = distance between adjacent coils
$i = \sqrt{-1}$
I = moment of inertia of mass per unit length
J = moment of inertia of cross-sectional area
$k$ = wave number for $w$-$w$ mode
$L_1, L_2, L_3$ = direction cosines defined by equation (5)
$M_1, M_2, M_3$ = direction cosines defined by equation (5)
M = bending moment about axis indicated by subscripts
$m$ = mass per unit length
$N_1, N_2, N_3$ = direction cosines defined by equation (5)
P = arbitrary point on coil
$p$ = angular frequency for
R = radius of principal curvature of centroidal axis of cross-section
$s$ = length of coil
$t$ = time
U, V, W = functions defined in text
$u, v, w$ = displacements along $x_1$, $y_1$, and $z_1$-axes, respectively
$x, y, z$ = coordinate axes defined in text
Z = property of cross-section defined in text
$\beta$ = direction cosine between $x_1$ and $y_o$
$\gamma$ = radius of gyration
$\epsilon$ = axial strain defined by equation (6)
$k$ = radius of curvature projected on $y$-$z$ plane
$k'$ = radius of curvature projected on $x$-$z$ plane
$\bar{k}$ = defined by equation (12)
$\bar{k}'$ = defined by equation (12)
$\lambda$ = wavelength of sinusoidal wave
$\nu$ = Poisson's ratio
$\rho$ = mass density
$\sigma_{ij}$ = stress, first subscript designates axis perpendicular to plane and the second subscript designates direction
$\tau$ = twist
$\sigma$ = radius of torsion (when used without subscript)
$\bar{\gamma}$ = defined by equation (12)
$\phi$ = angle of rotation

SUBSCRIPTS $o$ = unstrained
$l$ = strained
$x$ = along or about $x_1$-axis
$y$ = along or about $y_1$-axis
$z$ = along or about $z_1$-axis
$f$ = a constant that is related to the projected length of the position vector
$i, j, k,$ = unit vectors along the X,Y,Z axes, respectively
$h$ = the pitch distance between the coils
$\Theta$ = angle measured counter clockwise on the X-Y plane from the X-axis to the position vector projected on the plane.

It will be appreciated that the exact theoretical analysis of the test results is difficult. The testing results and calculation have not been heretofore known in the art.

The analysis of the test results of the Examples is limited to the determination of phase velocity, group velocity, and the natural frequency of oscillation of the helical coil in order to show the nature of wave propagation in the tangentially loaded helical coil of the invention. The coil was assumed to be infinitely long and an infinite train of sinusoidal waves is assumed to propagate in the coil. When the torsion is neglected, the governing equations of motion may be separated into two groups, one envolving the tangential and radial displacements and the other involving the twisting of the cross-section and the displacement parallel to the binormal. The derivation of the basic equations of motion are known and therefore will not be set out in detail. The analysis also disregards any variation across the cross-section of the coil and the lateral expansion of the coil.

EXAMPLE 1

Non-Varying Contour Coil

A helical coil was made of a commercially pure aluminum rod of ½ in. dia. as shown in FIG. 11. The internal diameter of the coil was 10 in., and the linear length of the coil was 356 inches. The coil had about 10 turns and the distance between each coil (i.e., pitch) was about 1 in. The coil had straight ends, at one of which a hammer was dropped from a known height to generate the stress pulse. The length of the straight portion of the coil was made much longer than twice the length of the hammer in order to make certain that the wave reflected from the curved section of the coil would not affect the generation of the pulse at the impact end. In order to prevent plastic deformation at the impact end of the coil a 1.5-in-long spacer made of an aluminum alloy was placed between the hammer and coil. The aluminum alloy had the same mechanical impedance as the commercially pure aluminum. The ends of the coil and the spacer were carefully lapped for complete transmission of the stress pulse across the interface. The other end of the spacer was rounded off in order to insure that the impact occurred at the center of the cross-section of the rod for purely axial loading without any bending. The coil was supported near the end opposite from the impact end so that the propagation of the waves was not affected by the supports.

Three different hammer sizes were used to vary the wavelength of the stress pulse. Two of the hammers were made of the same aluminum alloy as the spacer. One of the hammers was one-half in. in dia. and 6 in. long. The other was 4.5 in. long and one-half in. in dia. The third hammer was ½-in-dia. steel ball. The pulses generated by the two cylindrical hammers were long enough so that dispersion in the straight section did not exist. Although the pulse generated by the steel ball is expected to disperse in the straight section, the effect may be neglected because of its short length. The cylindrical hammers were mounted on two nylon sliders which slid down a guide from a predetermined height for impact with the coil. The steel ball was dropped through a copper tube, one end of which was placed just above the impact end of the coil. The hammers were dropped from 25 in.

The stress pulses were monitored by using strain gages mounted along the coil. The location of the strain gages and the linear length from the impact end to the gages, measured along the inner radius of the coil, are shown in FIG. 11. At each position, a set of two strain gages (designated by A) were mounted along the axial direction of the bar at 180° apart (or the tangential direction of the coil) to measure the axial elongation and another set of strain gages (designated by B) 180° apart from each other was mounted to measure the circumferential expansion of the bar. The outputs from the bridge circuits were amplified by solid-state amplifiers, the outputs of which were in turn supplied to an oscilloscope, Tektronix 555. The strain gages used were paper-mount foil gages, BLH FAP–12–12. The beam of the oscilloscope was made to trigger when the hammer came into contact with the coil. The pair of strain gages were connected in series.

Figure 12:
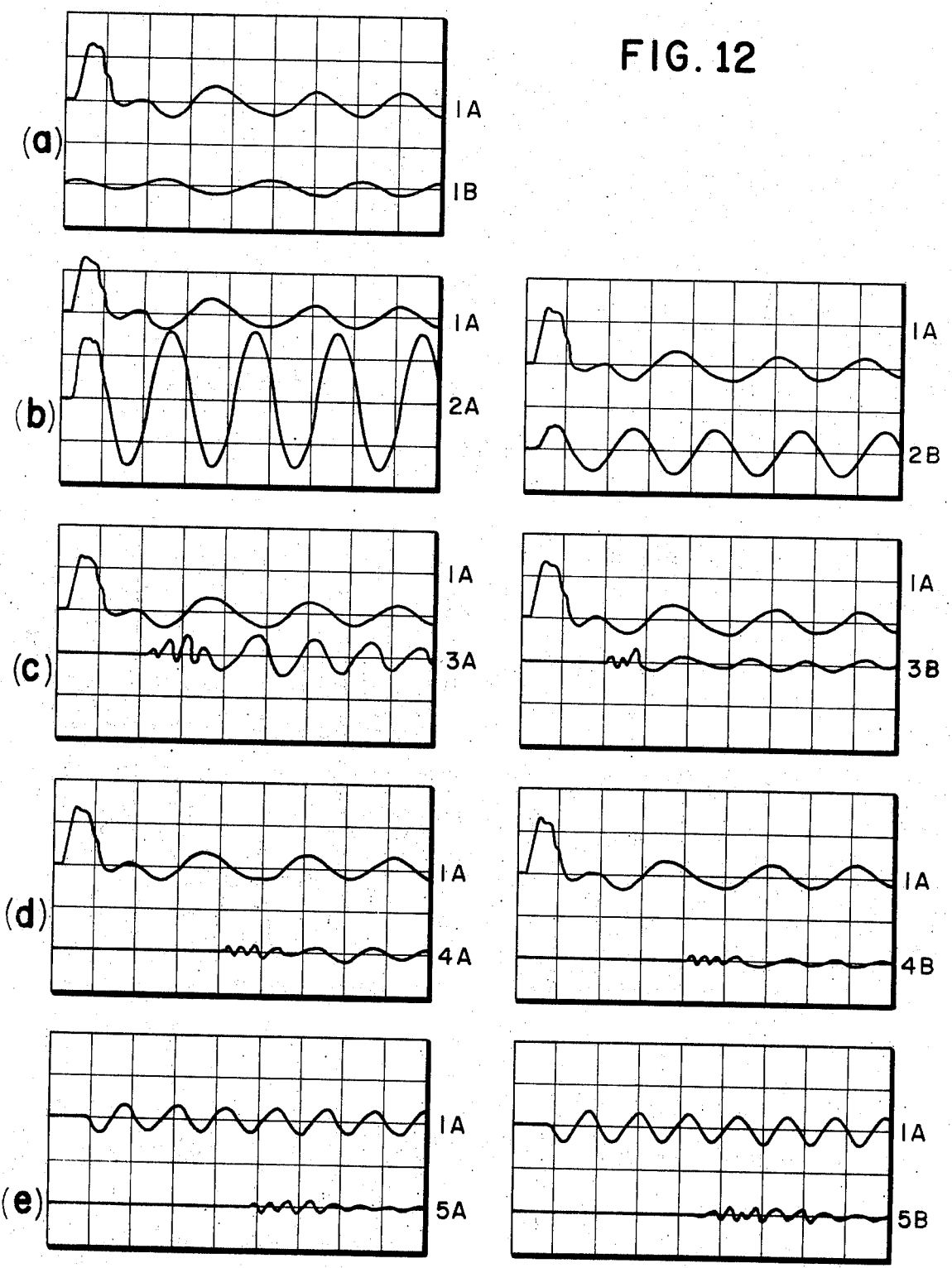
FIG. 12a–12e are oscilloscope trace patterns from axially and circumferentially mounted strain gauges used in connection with the embodiment illustrated in FIG. 11 when the device was subjected to impact energy with a 6 inch long aluminum hammer.
Figure 13:
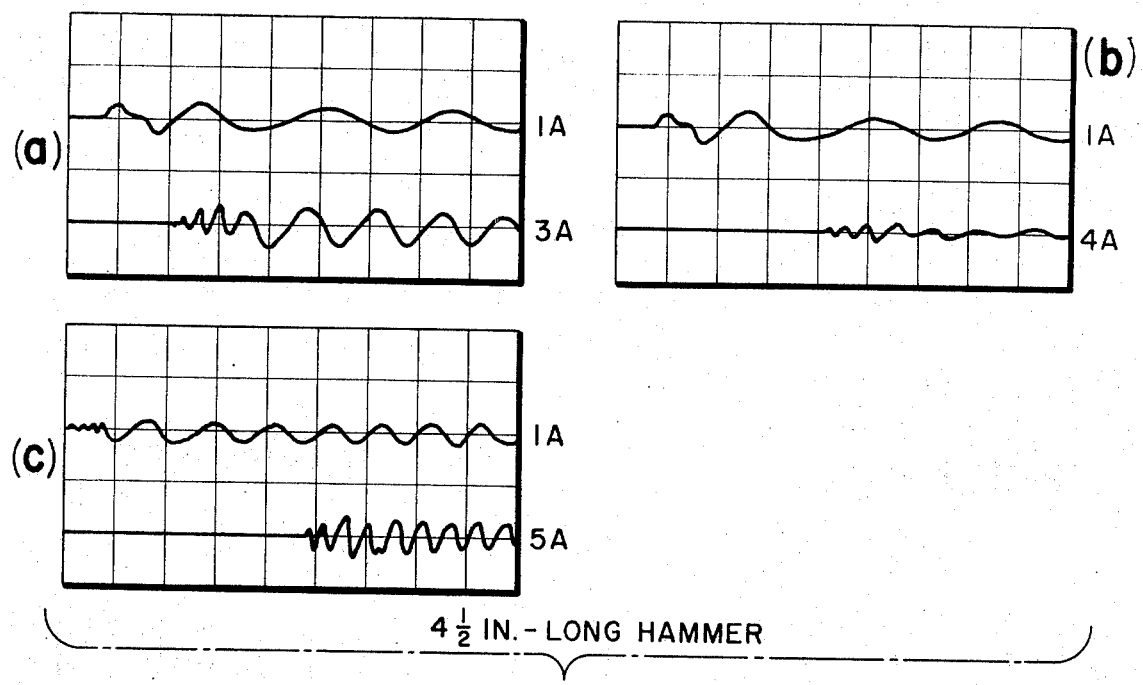
Figure 14:
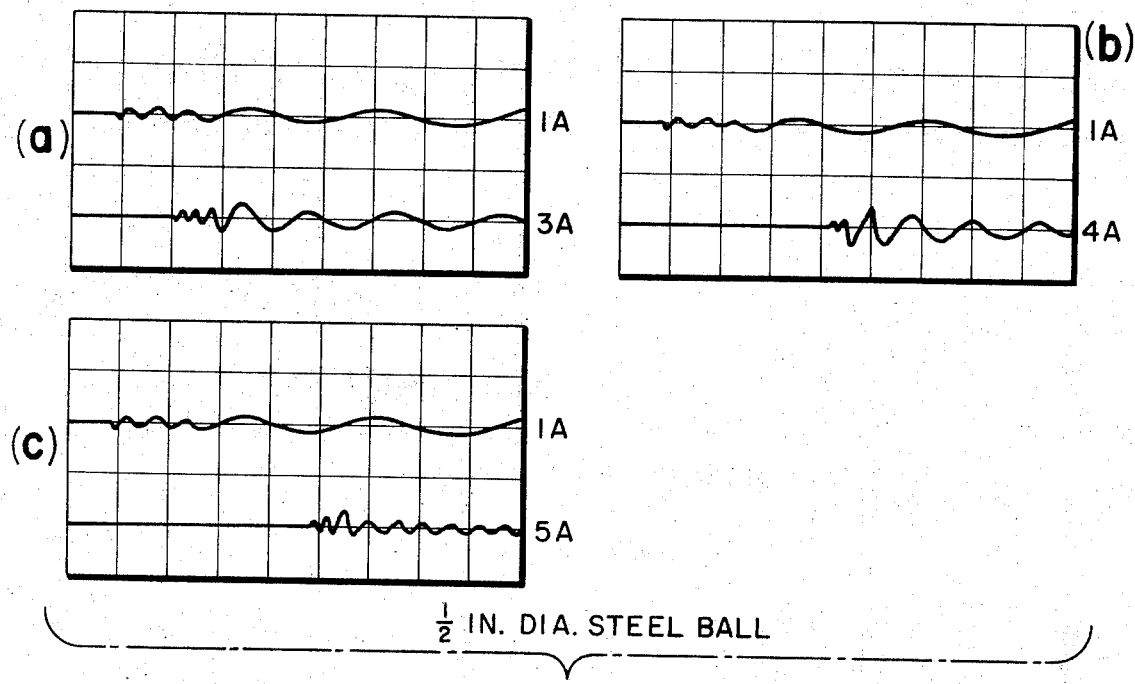

The test results are shown in FIGS. 12–14. FIGS. 12a–12e were obtained with a 6-in-long aluminum hammer. The designations are such that the first number denotes the location of the strain gages, as shown in FIG. 11. The second letter indicates the orientation of the gages, A for the axially mounted and B for the circumferentially mounted gages. The data from typical results are tabulated in Table 1. These data were obtained by projecting the pictures taken of the oscilloscope trace on a screen and measuring the necessary information. Efforts were made to be consistent in measurements of the distances between the points.

In FIGS. 12–14, the lower beam was amplified 1.5 times the upper beam. In all the pictures, the upper beam trace was obtained from the first set of gages and the lower beams were taken at the stations denoted in the margin. The sweep speed was $10^{-4}$ sec/cm except at the last station, where it was $2 \times 10^{-4}$ sec/cm. In these pictures, it should be noted that the incident pulse is in general decomposed into many small pulses as it propagates down the coil, as anticipated. The initial pulses are followed by a quasi-steady oscillatory motion of a reasonably constant frequency.

The group velocities are shown in the fourth column in Table 1. They were obtained by dividing the shortest distance the pulse traveled, which is the distance along the inner radius of the coil, by the time taken to reach the particular strain gage station from the first set of strain gages. They indicate that the front of the wave reached all strain gage stations with a velocity close to the bar velocity, which for this aluminum was $1.98 \times 10^5$ ips. The accuracy of the measurements is within ± 3 percent. The group velocity seems, in general, to decrease a little as the stress pulse propagates further along the coil, regardless of the initial pulse length, although it remains fairly close to the bar velocity.

The fifth column lists the pulse length of the first pulse in micro-seconds. The first subcolumn gives the pulse length measured at the first station, while the second subcolumn gives the pulse length as the first pulse reaches the particular gage station. The pulse length at the first station is longer than twice the length of the hammer. This is due to the fact that the impact end of the spacer was rounded off and therefore the hammer did not come to a complete stop until the stress was made several excursions in it, the hammer continuing to exert pressure on the coil during this period. It should also be noted that the length of the first pulse which is at the front of the degenerated wave becomes shorter and shorter as it travels down the coil.

The sixth column gives the relative amplitudes of the pulses in relation to the incident pulse amplitude. The second number for the upper trace is the amplitude of the sinusoidal portion of the wave measured at the first strain gage station. The numbers for the lower trace give the amplitudes of the succeeding pulses and the amplitude of the oscillatory part. When the quasi-steady oscillatory motion follows the first pulse immediately, without any second or third pulses, the space for the succeeding pulses is left blank. It will be noted that in all cases the amplitude of the first pulse is lower than those of the next few succeeding pulses. It was also discovered that the ratios of the amplitude of the first pulse to those of the succeeding pulses became more pronounced as the distance the pulse travels is greater, the ratios increasing more with the longitudinal components than with the circumferential components.

From the relative amplitude measurements given in Table 1, it is seen that in the straight section of the coil the ratio of the 1-B to the 1-A measurements yields the value for Poisson's ratio as 0.33, which is the value one obtains from quasi-static experiments. However, at other positions in the curved part of the coil, the ratio of the circumferential strain to the longitudinal strain becomes much larger than 0.33, indicating the state of stress is not uniaxial and is therefore quite complicated.

The seventh column lists the half periods of the quasi-steady oscillatory components. The periods in the curved section are all nearly the same, being equal to the natural frequency of oscillation as discussed in a later section.

It should be noted that since the strain gages were connected in series, the measurements made by the "A" gages partly cancelled the bending effect, but because of the initial curvature of the rod a small fraction of the bending was measured by the gages. The stress in a curved beam is given by the equation $$\sigma ZZ = (M/AR)\,[1 + (1/Z\,(y/R + y)],\quad (1)$$

where $Z$ for the circular cross-section is $$Z = 1 + 2\,(R/A)^2 - 2(R/A)[(R/A)^2 - 1]^{1/2}$$

$y$ is measured from the centroidal axis, being positive when measured toward the convex side. Therefore, the stress is not symmetrical about $y = 0$. For the coil under consideration, the stress at the outer radius of the coil is $$\sigma ZZ AR/M = 75.375,$$

while the stress at the inner radius is $$\sigma ZZ AR/M = 81.234.$$

Therefore, it is seen that about 7 percent of the bending stress is not cancelled out. The "B" gages are not influenced by bending.

A right-handed helical coil whose radius projected onto the plane perpendicular to the axis of the helix is loaded tangentially. It can be readily shown that the principal radius of curvature of the coil lies on planes parallel to this plane, pointing toward the axis of the coil, and is given by $$R = a^2 + c^2/a,\quad (2)$$

TABLE 1.—TABULATION OF EXPERIMENTAL RESULTS

| No. | Lower trace strain gage | Lower trace arrival (millisec.) | Group vel. (10⁻⁵ in. sec.) | Initial pulse length (μ sec.) Upper | Initial pulse length (μ sec.) Lower | Upper trace 1st | Upper trace Steady | Lower trace 1st | Lower trace 2d | Lower trace 3d | Lower trace 4th | Lower trace Steady | Half period (millisec.) Upper | Half period (millisec.) Lower |
|---|---|---|---|---|---|---|---|---|---|---|---|---|---|---|
| 1 | 1-B | | | 133 | 133 | 1.0 | 0.29 | 0.34 | | | | 0.09 | 0.108 | 0.12₅⁴ |
| 2 | 1-B | | | 133 | 133 | 1.0 | 0.29 | 0.33 | | | | 0.10 | 0.110 | 0.12₅ |
| 3 | 2-A | 0.067 | 2.029 | 133 | 78 | 1.0 | 0.29 | 0.96 | | | | 0.80 | 0.104 | 0.12₅ |
| 4 | 2-A | 0.067 | 2.029 | 133 | 80 | 1.0 | 0.30 | 0.95 | | | | 0.77 | 0.107 | 0.12₅ |
| 5 | 2-B | 0.067 | 2.029 | 133 | 80 | 1.0 | 0.28 | 0.38 | | | | 0.27 | 0.107 | 0.13₀ |
| 6 | 3-A | 0.206 | 1.996 | 133 | 28 | 1.0 | 0.28 | 0.39 | 0.39 | 0.50 | 0.22 | 0.24 | 0.106 | 0.07₄ |
| 7 | 3-A | 0.203 | 2.026 | 133 | 30 | 1.0 | 0.30 | 0.33 | 0.36 | 0.47 | 0.24 | 0.24 | 0.103 | 0.07₄ |
| 8 | 3-B | 0.206 | 1.996 | 133 | 30 | 1.0 | 0.28 | 0.18 | 0.06 | 0.22 | | 0.07 | 0.109 | 0.07₉ |
| 9 | 4-A | 0.405 | 2.014 | 133 | 15 | 1.0 | 0.30 | 0.11 | 0.28 | 0.25 | 0.28 | 0.21 | 0.103 | 0.06₉ |
| 10 | 4-B | 0.412 | 1.980 | 133 | 20 | 1.0 | 0.27 | 0.08 | 0.08 | 0.09 | 0.08 | 0.06 | 0.109 | 0.06₉ |
| 11 | 5-A | 1.015 | 1.883 | 133 | 15 | 1.0 | 0.23 | 0.09 | 0.18 | 0.20 | 0.18 | 0.15 | 0.130 | 0.06₃ |
| 12 | 5-B | 1.00 | 1.911 | 133 | 15 | 1.0 | 0.30 | 0.07 | 0.25 | 0.15 | 0.25 | 0.06 | 0.106 | 0.06₃ |
| 13 | 1-B | | | 106 | 106 | 1.0 | 0.23 | 0.33 | | | | 0.07 | 0.106 | 0.125 |
| 14 | 2-A | 0.068 | 2.000 | 106 | 80 | 1.0 | 0.24 | 0.92 | | | | 0.60 | 0.103 | 0.125 |
| 15 | 2-B | 0.067 | 2.029 | 106 | 80 | 1.0 | 0.23 | 0.36 | | | | 0.20 | 0.089 | 0.125 |
| 16 | 3-A | 0.200 | 2.056 | 106 | 28 | 1.0 | 0.23 | 0.32 | 0.51 | 0.35 | 0.25 | 0.24 | 0.098 | 0.075 |
| 17 | 3-B | 0.212 | 1.940 | 106 | 30 | 1.0 | 0.23 | 0.20 | 0.09 | 0.20 | | 0.09 | 0.109 | 0.075 |
| 18 | 4-A | 0.417 | 1.955 | 106 | 15 | 1.0 | 0.22 | 0.11 | 0.31 | 0.20 | 0.42 | 0.17 | 0.106 | 0.069 |
| 19 | 4-B | 0.417 | 1.955 | 106 | 15 | 1.0 | 0.21 | 0.05 | 0.09 | 0.13 | 0.12 | 0.08 | 0.106 | 0.069 |
| 20 | 5-A | 1.030 | 1.856 | 106 | 20 | 1.0 | 0.21 | 0.09 | 0.18 | 0.12 | 0.20 | 0.14 | 0.114 | 0.063 |
| 21 | 5-B | 1.00 | 1.911 | 106 | 20 | 1.0 | 0.24 | 0.04 | 0.07 | 0.06 | 0.06 | 0.06 | 0.103 | 0.063 |
| 22 | 1-B | | | 39 | 39 | 1.0 | 0.14 | 0.31 | | | | 0.02 | 0.103 | 0.125 |
| 23 | 2-A | 0.063 | 2.159 | 39 | 39 | 1.0 | 0.11 | 0.79 | | | | 0.25 | 0.092 | 0.125 |
| 24 | 2-B | 0.069 | 1.971 | 39 | 39 | 1.0 | 0.14 | 0.32 | | | | 0.10 | 0.097 | 0.125 |
| 25 | 3-A | 0.200 | 2.056 | 39 | 20 | 1.0 | 0.15 | 0.29 | 0.60 | 0.24 | | 0.16 | 0.097 | 0.075 |
| 26 | 3-B | 0.206 | 1.996 | 39 | 20 | 1.0 | 0.13 | 0.11 | 0.13 | 0.17 | | 0.06 | 0.091 | 0.075 |
| 27 | 4-A | 0.420 | 1.942 | 39 | 10 | 1.0 | 0.11 | 0.09 | 0.48 | 0.48 | 0.42 | 0.20 | 0.100 | 0.069 |
| 28 | 4-B | 0.430 | 1.897 | 39 | 10 | 1.0 | 0.11 | 0.07 | 0.15 | 0.19 | 0.10 | 0.05 | 0.100 | 0.069 |
| 29 | 5-A | 1.00 | 1.911 | 39 | 10 | 1.0 | 0.11 | 0.05 | 0.24 | 0.25 | 0.33 | 0.30 | 0.091 | 0.063 |
| 30 | 5-B | 1.00 | 1.911 | 39 | 10 | 1.0 | 0.11 | 0.07 | 0.10 | 0.14 | 0.10 | 0.05 | 0.103 | 0.063 |

The principal radius of curvature $R$ may be decomposed into components. For this purpose a moving coordinate system $(x_o, y_o, z_o)$ on the unstrained coil is defined at an arbitrary point $P_o$. The coordinate system is defined such that $z_o$ is tangent to the coil at $P_o$ and $x_o$ is parallel to the principal normal, $n$, the positive direction of $x_o$ being the same as that of $n$. The $y_o$-axis is oriented such that the coordinate system makes a right-handed coordinate system. Then, the curvatures projected on the $x_o$-$z_o$ plane and the $y_o$-$z_o$ plane are, respectively, given by $$K_o' = 1/R = a/a^2 + c^2 \tag{3}$$

$$k_o = 0.$$

The configuration of a curved rod can be described completely, if in addition to equations (3), the "twist" $\gamma_o$ is given, which is the rate of the change of the binormal along the rod. The binormal vector is perpendicular to the principal normal and tangent vectors in such a way that the tangent, principal, and binormal vectors, in this order, have the right-handed sense. The torsion $\tau_o$ is given by $$\tau_o = 1/\sigma = c/a^2 + c^2 \tag{4}$$

where $\sigma$ is the radius of torsion.

Now let the coil undergo elastic deformation. The point $P_o$ on the unconstrained coil will now be at $P_1$ c. At $P_1$ construct a reference frame $(x_1, y_1, z_1)$ such that $z_1$ is tangent to the coil at $P_1$ of the strained coil. $x_1$ is defined such that the $x_1$ and $z_1$-axes lie on the plane which is tangent at $P_1$ to the strained rod material originally in the $(x_o, z_o)$ plane. $y_1$ is again chosen such that the $(x_1, y_1, z_1)$ coordinate system is a right-handed one. After deformation, the original increment of length $\Delta s_o$ becomes $\Delta s_1$. The coordinate system $(x_o, y_o, z_o)$ is related to the $(x_1, y_1, z_1)$ system by direction cosines as

|     | $x_o$ | $y_o$ | $z_o$ |
|-----|-------|-------|-------|
| $x_1$ | $L_1$ | $M_1$ | $N_1$ |
| $y_1$ | $L_2$ | $M_2$ | $N_2$ |
| $z_1$ | $L_3$ | $M_3$ | $N_3$ |

(5)

$L_1, L_2, L_3, M_1$, etc., are direction cosines between the axes indicated. The elongation of the fiber through the centroids may be expressed as $$ds_1/ds_o = 1 + \epsilon. \tag{6}$$

The direction cosines are found to be, to the first order, $$L_3 = (\delta u/\delta s_o) + (w/R) - (\gamma/\sigma)$$
$$M_3 = (\delta v/\delta s_o) + (\mu/\sigma)$$
$$N_3 = 1$$
$$L_1 = M_2 = 1 \tag{7}$$

$$M_1 = -L_2 = \beta$$
$$N_1 = -L_3$$
$$N_2 = -M_3.$$

The axial strain may be written as $$\epsilon = (\delta w/\delta s_o) - (u/R). \tag{8}$$

The equations of motion can be written as $(\delta F_x/\delta s_o) - \bar{\tau}_1 F_y + \bar{k}_1' F_z = m(1 + \epsilon)(\delta^2 u/\delta t 2)$ along the $x_1$-axis $(\delta F_v/\delta s_o) - \bar{k}_1 F_s + \bar{\tau}_1 F_x = m(1 + \epsilon)(\delta^2 v/\delta t 2)$ along the $y_1$-axis $(\delta F_z/\delta s_o) - \bar{k}_1' F_x + \bar{k}_1 F_y = m(1 + \epsilon)(\delta^2 w/\delta t 2)$ along the $z_1$-axis $(\delta M_x/\delta s_o) - \bar{\tau}_1 M_y + \bar{k}_1' M_z - F_y(1 + \epsilon) = I_x(1 + \epsilon)(\delta^2 \phi x/\delta t 2)$ (9)

rotation about the $x_1$-axis $(\delta M_v/\delta s_o) - \bar{k}_1 M_z + \bar{\tau}_1 M_x + F_x(1 + \epsilon) = I_y(1 + \epsilon)(\delta^2 \phi y/\delta t 2)$ rotation about the $y_1$-axis $(\delta M_z/\delta s_o) - \bar{k}_1' M_x + \bar{k}_1 M_y = I_z(1 + \epsilon)(\delta^2 \phi z/\delta t 2)$ rotation about the $z_1$-axis,
where the forces acting on the cross section at $P_1$ are defined by $$F_x = \int \sigma_{zx} dA$$
$$F_y = \int \sigma_{zy} dA$$
$$F_z = \int \sigma_{zz} dA, \tag{10}$$

and the couples are defined by $$M_x = \int y_1 \sigma_{zz} dA$$
$$M_y = \int x_1 \sigma_{zz} dA$$
$$M_z = \int (x_1 \sigma_{zy} - y_1 \sigma_{zx}) dA.$$

(11)

It should be noted that these couples and forces are written with respect to the $(x_1, y_1, z_1)$-axes, but for small deformations the $x_1, y_1,$ and $z_1$-directions almost coincide with $x_o, y_o,$ and $z_o$, respectively. $\bar{K}_1, \bar{k}_1',$ and $\bar{\tau}_1,$ are related to the components of the principal curvature of the strained rod at $P_1$, i.e., $k_1, k_1',$ and $\tau_1,$ by $$\bar{k}_1 = k_1(1 + \epsilon)$$
$$\bar{k}_1' = k_1'(1 + \epsilon)$$

(12)

$$\tau_1 = \tau_1(1 + \epsilon),$$

where $$\bar{k}_1 = (62/R) - (\delta^2 v/\delta s_o^2) - 2/\sigma)(\delta u/\delta s_o) + (v/\sigma 2) - (w/R\sigma)$$

$$\bar{K}_1' = (1/R) + (\delta^2 u/\delta s_o^2) + (1/R)(\delta w/\delta s_o) - (u/\sigma^2) - (2/\sigma)(\delta v/\delta s_o)$$

$$\tau_1 = (\delta \beta/\delta s_o) + (1/R)(\delta v/\delta s_o) + (1/\sigma) + (u/R\sigma).$$

(13)

The moments and the axial force given in equations (10) and (11) may be related to the curvature and strain as $$M_x = EJ_x[(\beta/R) - (\delta^2 v/\delta s_o^2) - (2/\sigma)(\delta u/\delta s_o) + (v/\sigma^2) - (w/R\sigma)]$$

$$M_y = EJ_y[(u/R^2) + (\delta^2 u/\delta s_o^2) - (u/\sigma^2) - (2/\sigma)(\delta v/\delta s_o)]$$

$$M_z = C[(\delta \beta/\delta s_o) + (1/R)(\delta v/\delta s_o) - (1/\sigma)(\delta w/\delta s_o) + (2u/R\delta)]$$

$$F_z = EA(\delta w/\delta s_o - u/R), \tag{14}$$

where E is Young's modulus, A the cross-sectional area, $J_x$ and $J_y$ the moments of inertia of the cross-section about the $x_1$- and $y_1$-axis, respectively, and C the torsional rigidity. The angles of rotation about the $x_1$-, $y_1$- and $z_1$-axes are, respectively, $$\phi_x = -(\delta v/\delta s_o) - (u/\sigma)$$
$$\phi_y = (\delta u/\delta s_o) + (w/R) - (v/\sigma)$$
$$\phi_z = \beta, \tag{15}$$

where $\beta$ is equal to $M_1$.

Substituting Eqs. (13), (14), and (15), and simplifying, the equations of motion become $$(\delta F_x/\delta s_o) - (F_y/\sigma) + (EA/R)(\delta w/\delta s_0 - u/R) = m(\delta^2 u/\delta t^2) \tag{16a}$$

$$EA[(\delta^2 w/\delta s_o^2) - (1/R)\delta u/\delta s_o] - (F_x/R) = m(\delta^2 w/\delta t^2) \tag{16b}$$

$$(\delta F_y/\delta s_o) + (1/\sigma) F_x = m(\delta^2 v/\delta t) \tag{16c}$$

$$EJ_y [(\delta^3 u/\delta s_o^3) + (1/R^2 - 1/\sigma^2)(\delta u/\delta s_o) - (2/\sigma)(\delta^2 v/\delta s_o^2)] + (EJ_x/\sigma)[(\beta/R) - (\delta^2 v/\delta s_o^2) - (2/\sigma)(\delta u/\delta s_o) + (v/\sigma 2) - (w/R\sigma)] + F_x = I_y(\delta^2/\delta t^2) [(\delta u/\delta s_o) - (v/\sigma) + (w/R)] EJ_x[(1/R)(\delta \beta/\delta s_o) - (\delta^3 v/\delta s_o^3) - (2/\sigma)(\delta^2 u/\delta s_o^2) + (1/\sigma 2)(\delta v/\delta s_o) - (1/R\sigma)(\delta w/\delta s_o] - EJ_y/\sigma) [(\delta^2 u/\delta s_o^2) + (1/R^2 - 1/\sigma 2) u - (2/\sigma)(\delta v/\delta s_o)] + c/R [(\delta \beta/\delta s_o) + (1/R) \delta v/\delta s_o - (1/\sigma)(\delta w/\delta s_o) + (2u/R\sigma)] - F_y = I_x(\delta^2/\delta t^2)[-(\delta v/\delta s_o) - (u/\sigma)] \tag{16e}$$

$$C[(\delta^2 \beta/\delta s_o^2) + (1/R)(\delta^2 v/\delta s_o^2) - (1/\sigma)(\delta^2 w/\delta s_o^2) + (2/R\sigma)(\delta u/\delta s_o)] - (EJ_x/R)[(\beta/R) - (\delta^2 v/\delta s_o^2) - (2/\sigma)(\delta u/\delta s_o) + (v/\sigma^2) - (w/R\sigma)] = I_z(\delta^2 \beta/\delta t^2) \tag{16f}$$

Eqs. (16d) and (16e) may be solved for $F_x$ and $F_y$ and substituted into the rest of the equations (16a, b, c, f) to obtain four equations in terms of the four unknowns, $u, v, w$, and $\beta$. If $\sigma > R$, the above equations may be separated into two groups, one involving only $u$ and $v$ components and the other including only $v$ and $\beta$ components.

If we assume an infinite train of sinusoidal waves is propagating in the coil, the displacements and $\beta$ may be expressed as $$u = U(x_o, y_o) \exp[i(k z_o - p t)]$$
$$v = V(x_o, y_o) \exp[i(k z_o - p t)]$$
$$w = W(x_o, y_o) \exp[i(k z_o - p t)]$$
$$\beta = B(x_o, y_o) \exp[i(k z_o - p t)] \tag{17}$$

where for purposes of this determination
$p = 2\pi f$
$k = 2\pi \lambda$
$f$ = frequency
$\lambda$ = wavelength
$z_o = s_o$
$i = \sqrt{-1}$ Substituting Eqs. (17) into the four Eqs. (16) which are obtained after eliminating $F_x$ and $F_y$, the following four equations are obtained:

$$iA_1 U + D_1 W + F_1 V + H_1 B = 0$$
$$iA_2 U + D_2 W + F_2 V + H_2 B = 0$$
$$iA_3 U + D_3 W + F_4 V + H_3 B = 0$$
$$iA_4 U + D_4 W + F_4 V + H_4 B = 0 \tag{18}$$

where $$A_1 = -[-(p/c_o)^2 + k^2 + (6/\sigma 2) - (1/R^2)]k^2 + [(1/\gamma 2) + (1/\sigma 2)(p/c_o)^2 - 1/R^2\gamma^2 - 1/R^2\gamma^2[1 + \gamma_z^2/\sigma^2(1+\nu)] + (1/\sigma^2)(1/R^2 - 1/\sigma^2)$$

$$D_1 = (k/R\{(p/c_o)^2 - 1/\sigma^2[2 + (1/2(1+\nu)(\mu_z^2/\gamma)^2] - (1/\gamma^2)\}$$

$$F_1 = (k/\sigma) [-2 (p/c_o)^2 + 4k^2 + 4/\sigma 2 + (1/2(1+\nu)(1/R^2)(\gamma_z/\gamma)^2]$$

$$H_1 = k/\sigma R [2 + (1/2(1+\nu))(\gamma_z/\gamma)^2]$$

$$A_2 = (k/R) [-1 + \gamma^2 (p/c_o)^2 - \gamma^2 k^2 + (\gamma/R)^2 - 3(\gamma/\sigma)^2]$$

$$D_2 = [-k^2 + (p/c_o)^2 (1 + (\gamma^2/R^2) - (\gamma^2/\sigma^2 R^2))]$$

$$F_2 = (\gamma^2/R\sigma[-(p/c_o)^2 + 3 k^2 + (1/\sigma^2)]$$

$$H_2 = 0$$

$$A_3 = (k\gamma^2/\sigma)\{4 k^2 - 2(p/c_o)^2 + (4/\sigma^2) + 1/R^2 [(1/1+\nu)(\gamma_z/\gamma)^2 - 2\}$$

$$D_3 = \gamma^2/R\sigma\{1 + 1/2(1+\nu)(\gamma_z/\nu)^2] k^2 - (p/c_o)^2 + 1/\sigma 2\} 9$$

$$F_3 = \gamma^2 \{-k^4 [(6/\sigma 2) + (1/2(1+\nu)R^2)(\gamma_z/\gamma)^2]k^2 + (1/\sigma 2) + (1/\gamma 2)(p/c_o)^2 + k^2 (p/c_o) - 1/\sigma 4\}$$

$$H_3 = -(\gamma^2/R) \{1 + (1/2(1+\nu))(\gamma_z/\nu)^2] k^2 + 1/\sigma^2\}$$

$$A_4 = (2k/R\sigma) [1 + 2(1+\nu)(\gamma/\gamma_z)^2]$$

$$D_4 = (1/\sigma) [k^2 + (2(1+\nu/R^2)(\gamma/\gamma_z)^2]$$

$$F_4 = (1/R) \{-[1 + 2(1+\nu)(\gamma/\gamma_z)^2]k^2 - (2(1+\nu/\sigma^2)(\gamma/\gamma_z)^2\}$$

$$H_4 = -k^2 + (p/c_o)^2 (c_o/c_s)^2 - 2(1+\nu/R^2)(\gamma/\gamma_z)^2 \tag{19}$$

In Eqs. (19) the radii of gyration $\gamma$ and $\gamma_z$ and the wave velocities $c_o$ and $c_s$ are obtained from the following definitions:

$$c_o^2 = EA/m$$
$$\gamma^2 = I_y/m = J_y/A = J_x/A$$
$$c_s^2 = GA/m$$
$$\gamma_z^2 = 2(1+\nu)(C/EA)$$
$$\nu = \text{Poisson's ratio}$$

$$\tag{20}$$

$$\begin{vmatrix} A_1 & D_1 & F_1 & H_1 \\ A_2 & D_2 & F_2 & H_2 \\ A_3 & D_3 & F_3 & H_3 \\ A_4 & D_4 & F_4 & H_4 \end{vmatrix} = 0 \quad (21)$$

The above equation is the frequency equation. The phase velocity $C_p$ and the group velocity $C_g$ are $$C_p = p/k$$
$$C_g = dp/dk \quad (22)$$

The frequency equation is first solved for $p$ and $C_p$. The group velocity is obtained numerically from the values of $p$ at given values of $k$. It should be noted that energy is transmitted at the group velocity.

Eq. (21) has four positive real roots except at very large wavelengths. The phase velocities and the group velocities are plotted in FIGS. 15 through 20. FIG. 15 shows the variation of the phase velocity with wave numbers for various values of the radius of gyration of the cross-section at the fixed values of the radius of gyration of the cross-section at the fixed values of torsion $\sigma = 60$ inches and curvature $R = 2$ inches. It should be noted that two of the values approach infinity as $k \to 0$, while the other two approach zero and then gradually increase again. Three of the values approach the bar velocity $C_o$ as $k \to \infty$, while one of the values approach $C_s$ as $k \to \infty$. These results are about the same as when the effect of $\sigma$ is neglected. The curves marked "1" and "2" are associated with the $u - w$ mode of propagation and the ones marked "3" and "4" are associated with the $\beta - v$ mode of propagation. It can be shown that when $\sigma$ is neglected, the "3" curve does not approach infinity as $k \to 0$.

It should be noted that the first mode shown is not affected appreciably by the change in the radius of gyration, indicating that it is closely associated with the extensional deformation of the locus of centroids of the cross-section. The second mode is nearly independent of the principal radius of curvature, as shown in FIG. 15. This mode is associated with the radial flexural deformation of the coil.

The influence of the radius of torsion on phase velocity $C_p$ is shown in FIG. 16. The effect of varying o from 2 to 60 inches is very small for "1," except when $k$ is very small. Its effect on "2" is fairly appreciable at large wavelengths, i.e., small $k$, which is reasonable since it is associated with the flexural mode of deformation. The "3" curve behaves about the same as "2" and the same comments hold true. The fourth mode is also influenced by the radius of torsion at very small values of $k$.

FIG. 17 shows the influence of the radius of curvature on $C_p$. It shows that except when $k \to 0$, it has negligible effect on $C_p$. The influence of the radius of curvature on the group velocity is illustrated in FIG. 18. It should be noted that the group velocity corresponding to the first mode (extensional mode) approaches the bar velocity $C_o$ faster with decrease in wavelength as the radius of curvature increases. This seems to be reasonable, since in the limit as $R \to \infty$, the present analysis should yield $C_g = C_o$. Although the group velocity for the third mode approaches 0 as $k \to 0$ in varying coil approached the shear wave velocity when torsion is neglected. Both the second and the third modes exceed the bar velocity $C_o$ and then approach it asymptotically. The fourth mode also exceeds the shear wave velocity and approaches it asymptotically as the wavelength is decreased. The reason for this is that the third and fourth modes represent the combined effect of the $\beta$-$v$ modes of propagation. As the radius of curvature decreases the size of the "hump" in the fourth mode is less, reinforcing the argument presented here.

FIG. 19 shows the influence of the radius of torsion on the group velocity. It shows that the first mode is not influenced much by the change in torsion. However, when $\sigma$ is small, i.e., $\sigma = 2$ inches, the second mode undergoes a saddle-point-like transition which is quite different from when $\sigma = 60$ inches. The third and the fourth modes depart from each other when the wave number is larger than 10 inches $^{-1}$. FIG. 20 shows the variation of the group velocity as the radius of gyration is changed. Again it is shown that the first mode is not influenced much, but the rest of the modes are influenced. It should be noted that the group velocities are obtained by finite difference approximations from the numerical values obtained for the frequency, and are therefore not exact. It should also be noted that as the wavelength becomes very long, i.e., $k = 0$, some of the roots become complex.

In short, the analytical results show that the waves with short wavelengths propagate faster than the longer wavelength waves and as the radius of curvature decreases, the group velocity decreases for a given wavelength, especially the first mode. The diameter of the cross-section of the coil has significant influence.

Based on the theoretical results obtained the experimental results presented as Example I will be discussed. The first mode shown in FIGS. 15–21 is associated with the extension of the coil as stated earlier. Therefore, the stress pulses shown in FIGS. 12, 13 and 14 are governed by the group velocity shown in FIGS. 18, 19 and 20. The reason the initial pulse length becomes shorter and shorter is because only the short wavelength components propagate with the bar velocity and the longer wavelength components lag behind. It should be noted that the initial pulse is composed of many waves of various frequencies. Since the high-frequency Fourier components of the pulse have lower amplitudes than the longer wavelength components, the amplitude of the pulse at the front decreases as the pulse propagates along the coil. Consequently, the slower-moving succeeding pulses have higher amplitudes. Also, the length of the pulse that arrives at a given station in the coil first becomes shorter and shorter since it represents the superposition of several short wavelength components.

The observed decrease in the group velocity along the coil may be due to the fact that the short wavelength components which travel at the bar velocity must decrease in amplitude as the pulse disperses continuously. Therefore, the very front of the pulse may have such a low amplitude that it is not measurable. This is substantiated by the decrease in the pulse length as the distance of wave propagation increases.

It should be noted that the absolute value of the group velocity calculated from the experimental results may not be exact since the distance the wave propagated was measured along the shortest path.

The dispersion of the pulse is expected to be greater as the principal radius of curvature decreases, because the difference in the group velocity becomes greater as the radius decreases. It also implies that if the coil is so made that its principal radius of curvature changes continuously, the coil can decompose the initial pulse in an arbitrary manner by controlling the group velocity.

The analysis discussed hereinbefore states that the natural frequency varies continuously as a function of wavelength. The experimentally measured period decreases, but not in exact accordance with the theoretical predictions, indicating that the simple theory is not sufficient to predict all the experimental results. However, the quasi-steady oscillatory parts have natural frequencies corresponding to the basis mode. The experimental values compare very favorably with the theoretical result of the half period of $0.064 \times 10^{-3}$ sec.

The test results show that the stress is highest in the straight section, when the first incident pulse passes through it. Therefore, the maximum magnitude of the impact stress that may be applied to the coil is limited by the uniaxial dynamic yield stress of the metal, unless a certain amount of plastic deformation can be tolerated. The invention impact load disperser may be combined with other shock absorbers, particularly for extremely large loads. It is important to the construction of the devices of the invention that the adjacent coils never touch each other laterally during the loading. It was discovered that small variations in the pitch of the coil does not significantly affect the results.

It may readily be appreciated that utilizing the foregoing method, as exemplified by mathematical determination, impact load dispersers may be designed for substantially any situation calling for the minimization or elimination of impact damage.

EXAMPLE II

Varying Contour Coil

FIG. 21 depicts a helical coil with varying radius of curvature. For the tests we manufactured a coil substantially as depicted from a commercially pure aluminum rod of ½-inch diameter. The internal diameter of the coil was 8 inches at the larger end and 2 inches at the smaller end. The coil had about 7 ½ turns and the distance between each coil was about 1 inch. As in Example I the coil had straight ends, at one of which a hammer was dropped from a known height to generate the stress pulse. The length of the straight portion of the coil was made much larger than the length of the hammer in order to make certain that the wave reflected from the curved section of the coil would not interfere with the generation of the wave at the impact end. Plastic deformation of the coil at the impact end was prevented by placing a 1.5 inch long spacer made of an aluminum alloy at the end. The aluminum alloy had the same mechanical impedance as the commercially pure aluminum. The ends of the coil and the spacer were carefully lapped for complete transmission of the stress pulse across the interface. The other end of the spacer was slightly rounded to insure axial loading. The coil was supported at the opposite end from the impact end in order to make certain that the waves reflected from external constraints would not interfere with the measurements.

One of the hammers was a 4 ½ inches long cylindrical rod made of the same aluminum alloy as the spacer. The other hammer was a ½-inch diameter steel ball. The pulses generated by the cylindrical hammer were long enough so that there was no dispersion in the straight section. Although the pulse generated by the steel ball is expected to disperse in the straight section, the effect may be neglected because of its short length. The cylindrical hammer mounted on two nylon sliders slid down a guide from a predetermined height for impact with the coil. The steel ball was dropped through a copper tube. The hammers were dropped from 3 feet.

The stress pulses were monitored by strain gages (BLH, FAP 12–12) mounted along the coil as described in Example I. The locations are shown in FIG. 21 with the linear length from the impact end to the gages, measured along the inner radius of the coil.

Figure 22:
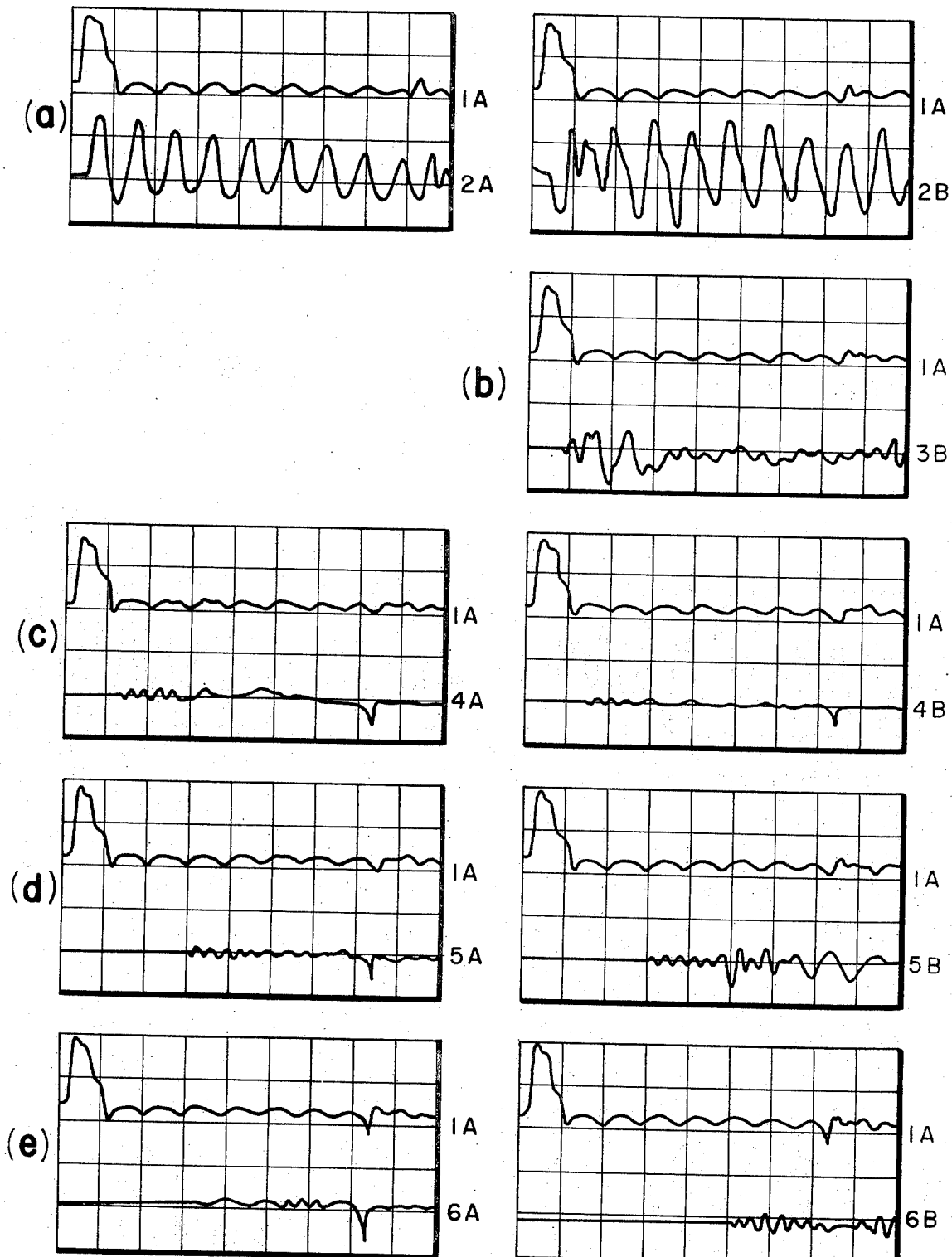
Figure 23:
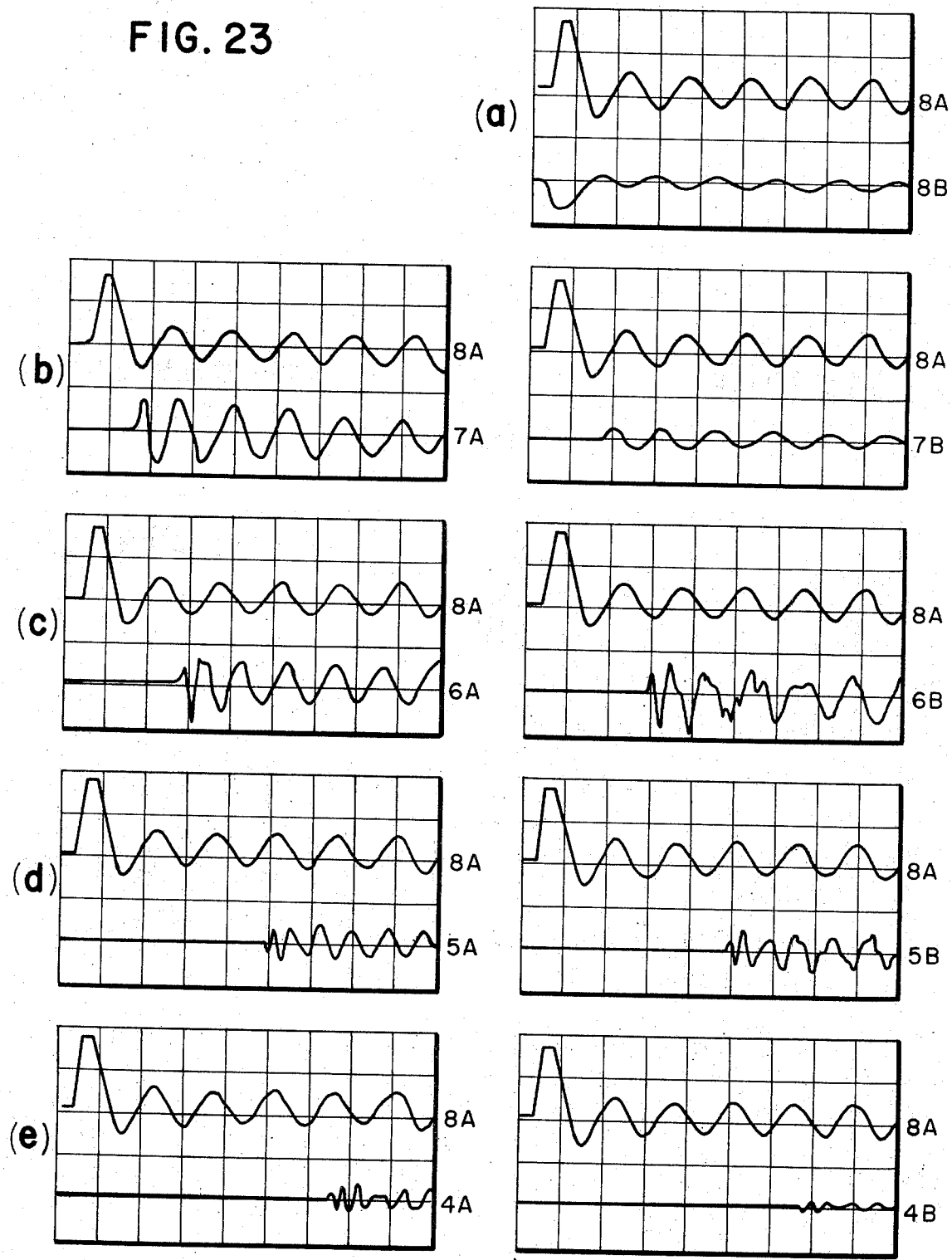
Figure 24:
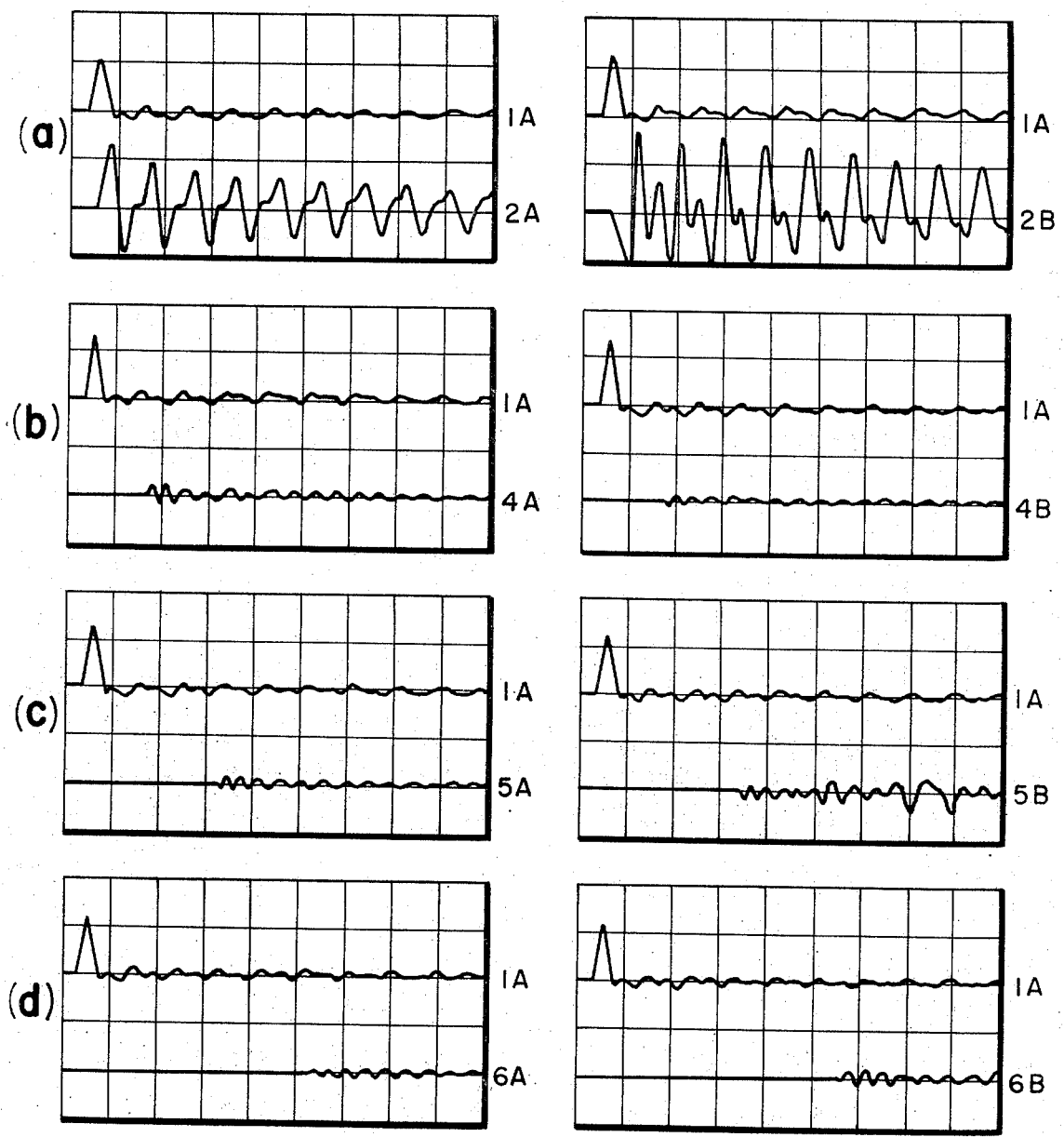
Figure 25:
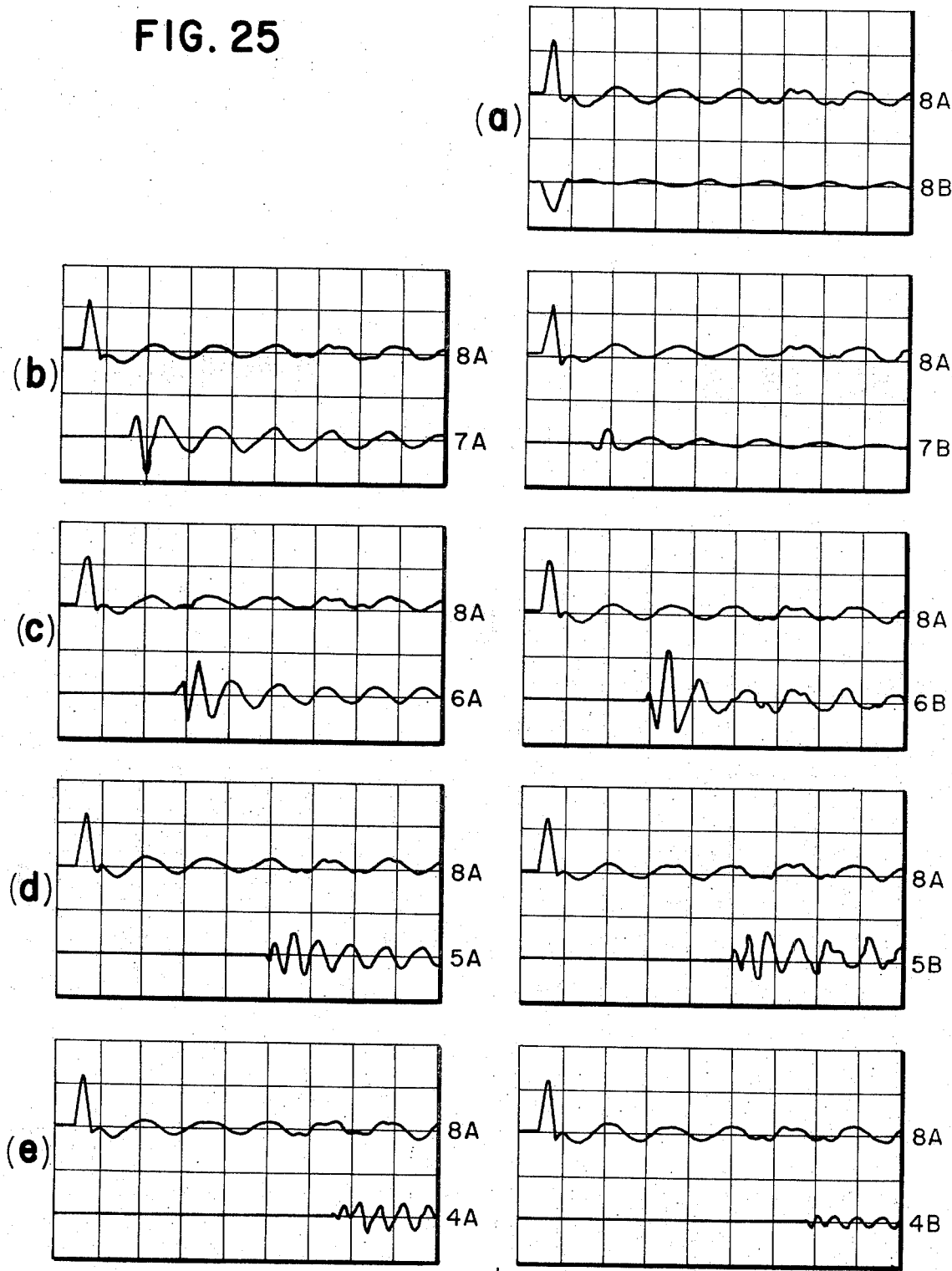

FIGS. 22 through 25 illustrate the test results. These results are tabulated in Table II. The difference between FIG. 22 and FIG. 23 is that the former was obtained by loading the smaller end of the helical coil, while the latter was obtained by loading the larger end of the coil. The major point illustrated by comparing these two figures is that the stress pulse loaded at the smaller end breaks up much faster than the loaded at the larger end, after an equivalent distance has been covered by the pulse. FIG. 22 and 23 were obtained using the 4 ½ inch long cylindrical hammer. The same point is illustrated by the experimental results obtained using the ½-inch diameter steel ball, as shown by FIGS. 24 and 25. FIG. 24 was obtained by generating the stress pulse at the smaller end, while FIG. 25 shows the stress pulses generated at the larger end.

Another important result is that the wave that arrives at each station first has the lowest amplitude in all the cases, and as shown in Table II, all of them propagate with velocities close to the bar velocity $C_o = \sqrt{E/\sigma}$. Another interesting result is that the frequency of the first pulse arriving at each station is the highest, followed by low frequency waves which finally reach steady state oscillations. These results are in accordance with the theoretical predictions made in Example I.

It should be noted that the upper beams were amplified 10.5 times, whereas the lower beams were amplified 16.7 times. "A" designates the strain gages mounted along the axis of the

TABLE II.—TABULATION OF EXPERIMENTAL RESULTS

| No. | Hammer, C-Cyl, B=Ball | Upper trace strain gage | Lower trace strain gage | Group Vel ($10^{-5}$ in./sec.) | Initial pulse length ($\mu$ sec.) | Upper trace 1st | Upper trace Steady | Lower trace 1st | Lower trace 2d | Lower trace 3d | Lower trace 4th | Lower trace 5th | Half period (micro-second) Upper | Half period (micro-second) Lower | Lower trace arrival time |
|---|---|---|---|---|---|---|---|---|---|---|---|---|---|---|---|
| 1 | B | 1A | 2A | 2.05 | 51.5 | 1 | | 0.855 | 0.629 | 0.629 | 0.562 | 0.495 | 46.5 | 46.5 | 31.4 |
| 2 | B | 1A | 2B | | 45.7 | 1 | | 0.70 | 0.925 | 0.542 | 0.765 | 0.65 | 46.5 | 45.7 | 25.7 |
| 3 | B | 1A | 4A | 2.07 | 45.7 | 1 | | 0.048 | 0.097 | 0.09 | 0.125 | 0.097 | 46.5 | 21.5 | 128.6 |
| 4 | B | 1A | 4B | 1.86 | 42.9 | 1 | | 0.044 | 0.061 | 0.061 | 0.061 | 0.041 | 46.5 | | 143.0 |
| 5 | B | 1A | 5A | 1.86 | 42.9 | 1 | | 0.032 | 0.043 | 0.096 | 0.096 | 0.111 | 45.7 | 22.2 | 280.0 |
| 6 | B | 1A | 5B | 1.86 | 42.9 | 1 | | 0.023 | 0.031 | 0.093 | 0.093 | 0.093 | 45.7 | | 280.0 |
| 7 | B | 1A | 6A | 1.82 | 42.9 | 1 | | 0.038 | 0.048 | 0.058 | 0.077 | 0.058 | 45.7 | 24.2 | 507.0 |
| 8 | B | 1A | 6B | 1.83 | 42.9 | 1 | | 0.027 | 0.065 | 0.102 | 0.111 | 0.129 | 45.7 | | 503.0 |
| 9 | C | 1A | 2A | 2.05 | 88.7 | 1 | | 0.785 | 0.237 | 0.475 | 0.144 | 0.392 | 45.7 | 45.0 | 31.4 |
| 10 | C | 1A | 2B | 2.25 | 88.7 | 1 | | 0.795 | 0.415 | 0.154 | 0.486 | 0.440 | 45.7 | 45.7 | 28.6 |

TABLE II.—Continued TABULATION OF EXPERIMENTAL RESULTS

| No. | Hammer, C-Cyl, B=Ball | Upper trace strain gage | Lower trace strain gage | Group Vel (10⁻⁵ ¹ in./sec.) | Initial pulse length (μ sec.) | Relative amplitudes of measurable waves ||||||| Half period (micro-second) || Lower trace arrival time |
|---|---|---|---|---|---|---|---|---|---|---|---|---|---|---|---|
| | | | | | | Upper trace || Lower trace |||||| Upper | Lower | |
| | | | | | | 1st | Steady | 1st | 2d | 3d | 4th | 5th | | | |
| 12 | C | 1A | 3B | 1.99 | | 1 | | 0.036 | 0.107 | 0.142 | | | 45.7 | | 65.0 |
| 13 | C | 1A | 4A | 2.58 | 94.2 | 1 | | 0.024 | 0.036 | 0.048 | 0.041 | 0.059 | 45.7 | | 103.0 |
| 14 | C | 1A | 4B | 2.08 | 88.7 | 1 | | 0.024 | 0.036 | 0.024 | 0.036 | 0.012 | 45.7 | | 128.0 |
| 15 | C | 1A | 5A | 1.88 | 91.5 | 1 | | 0.023 | 0.023 | 0.041 | 0.046 | 0.046 | 45.7 | 17.7 | 277.2 |
| 16 | C | 1A | 5B | 1.88 | 91.5 | 1 | | 0.028 | 0.028 | 0.044 | 0.055 | 0.044 | 45.7 | | 277.2 |
| 17 | C | 1A | 6A | 1.85 | 91.5 | 1 | | 0.033 | 0.033 | 0.033 | 0.039 | 0.044 | 45.7 | | 497.2 |
| 18 | C | 1A | 6B | 1.85 | 91.5 | 1 | | 0.011 | 0.026 | 0.037 | 0.053 | 0.069 | 45.7 | | 497.2 |
| 20 | B | 8A | 4A | 1.88 | 37.1 | 1 | 0.15 | 0.052 | 0.052 | 0.155 | 0.135 | 0.206 | 72.9 | 27.9 | 606 |
| 21 | B | 8A | 4B | 1.86 | 37.1 | 1 | 0.16 | 0.107 | 0.044 | 0.061 | 0.044 | 0.087 | 72.9 | | 612 |
| 22 | B | 8A | 5A | 1.99 | 37.1 | 1 | 0.23 | 0.068 | 0.144 | 0.221 | 0.306 | 0.255 | 72.9 | 41.5 | 443 |
| 23 | B | 8A | 5B | 1.98 | 37.1 | 1 | 0.155 | 0.051 | 0.153 | 0.255 | 0.306 | 0.306 | 72.9 | | 446 |
| 24 | B | 8A | 6A | 2.06 | 37.1 | 1 | 0.18 | 0.13 | 0.402 | 0.507 | 0.314 | 0.210 | 72.9 | 59.2 | 234 |
| 25 | B | 8A | 6B | 1.95 | 37.1 | 1 | 0.164 | 0.013 | 0.404 | 0.665 | 0.450 | 0.324 | 72.9 | | 248 |
| 26 | B | 8A | 7A | 2.12 | 37.1 | 1 | 0.205 | 0.343 | 0.496 | 0.332 | 0.334 | 0.210 | 72.9 | 65.6 | 111 |
| 27 | B | 8A | 7B | 2.12 | 37.1 | 1 | 0.143 | 0.081 | 0.234 | 0.072 | 0.099 | 0 | 72.9 | | 111 |
| 28 | B | 8A | 8A | | 37.1 | 1 | | | | | | | 72.9 | | |
| 29 | C | 8A | 4A | 1.94 | 88.5 | 1 | 0.25 | 0.023 | 0.07 | 0.081 | 0.128 | 0.105 | 71.4 | 17.1 | 585 |
| 30 | C | 8A | 4B | 1.87 | 88.5 | 1 | 0.25 | 0.023 | 0.034 | 0.045 | 0.045 | 0.045 | 71.4 | 15.7 | 608 |
| 31 | C | 8A | 5A | 1.97 | 88.5 | 1 | 0.26 | 0.065 | 0.119 | 0.152 | 0.119 | | 71.4 | (41.5) | 448 |
| 32 | C | 8A | 5B | 1.95 | 88.5 | 1 | 0.21 | 0.055 | 0.121 | 0.165 | 0.132 | | 71.4 | | 452 |
| 33 | C | 8A | 6A | 2.12 | 88.5 | 1 | 0.26 | 0.129 | 0.236 | 0.219 | 0.248 | 0.225 | 71.4 | (58.5) | 228 |
| 34 | C | 8A | 6B | 2.00 | 88.5 | 1 | 0.25 | 0.107 | 0.281 | 0.309 | 0.365 | | 71.4 | | 242 |
| 35 | C | 8A | 7A | | 88.5 | 1 | 0.25 | 0.331 | 0.348 | 0.324 | 0.292 | 0.271 | 71.4 | 67.0 | |
| 36 | C | 8A | 7B | | 88.5 | 1 | | | | | | | 71.4 | | |
| 37 | C | 8A | 8B | | 88.5 | 1 | | 0.313 | | | | | 71.4 | | |

¹ Based on the distance measured along the centroids.

cross-section of the coil in series, while "B" gages were mounted circumferentially in series. Because of the curvature, the measurements by the "A" gages did not completely cancel the bending effects. However, as shown in Example I with respect to a constant radius coil the effects were rather small.

The test results will hereafter be discussed in more detail based on the numerical values shown in Table II, which were tabulated using FIGS. 22 through 25. The group velocities are shown in the fifth column. These values were obtained by dividing the distance the stress pulses traveled, measured along the centroids, by the time taken to arrive at each station. It should be noted that these group velocities are close to the bar velocity $\sqrt{E/\sigma}$ within the experimental approximation, which for this aluminum is $1.98 \times 10^5$ inches/sec. It should also be noted that the group velocity tends to decrease as the distance covered by the pulse increases. This is due in part to the inability of the technique employed to measure very low amplitude waves. These group velocities are slower than those measured in the constant radius helix of Example I. This is due to severe degeneration of the stress pulse in the present case because of the smaller radius of curvature. It should be noted that if the shortest paths were used in the calculation, the group velocities would be less than those indicated.

The sixth column shows the pulse lengths. It should be noted that the initial pulse length generated by the cylindrical hammer was about four times the length of the hammer, as expected. The impedances were not perfectly matched at the impact ends, since the impact end of the spacer was rounded.

The seventh column lists the relative amplitudes of the pulses in order to indicate the rate of the amplitude change. The amplitude of the lower traces are of those measurable waves measured in sequence, since the very first wave was not measurable in some cases because of extremely low amplitudes. Even the amplitudes of the first waves listed are not very accurate. It should be noted that the amplitudes of the waves propagating from the smaller end to the larger end of the helical coil are much lower than those propagating in the opposite direction.

The eighth column lists the half periods of the oscillatory portion of the waves. The half periods of the upper traces may be compared with the natural frequency of rings with the same radius as the coil. At the larger end of the coil where the radius is approximately 4.25 inches, the half period is 66.8 micro-seconds which compares very favorably with the experimental results. At the smaller end the comparison is not as favorable. This could be because of the long straight section at the smaller end of the coil.

The results developed in Example II can be discussed qualitatively in terms of theoretical finds presented in Example 1. Both the experimental work and the theoretical results show the tangentially loaded helical coil brings about dispersion of impact waves. The rate of dispersion is greater when the radius of the coil is small, as predicted by the theoretical results. This fact is shown by the experimental results which showed that the stress pulse disperse faster when the coil is loaded at the smaller end.

The experimental results show that as the distance the pulse propagates increases, the group velocity of the first measurable wave components decreases. This is because the very first wave components that arrive at a given station have too small amplitudes to be measured by the present experimental technique since low amplitudes are associated with high frequency waves. This is substantiated by the decrease in pulse length as well as by the decrease in amplitude as the distance of the wave propagation increases.

The comparison of the experimental results obtained by loading the larger end with those obtained by loading at the smaller end indicates that the amplitudes of the pulse in the former case decrease gradually, whereas in the latter case the amplitudes decrease suddenly after passing through the coil with the smallest radius of curvature and remain about the same afterwards. This indicates that the first coil in the latter case acts as a filter. The difference between these two cases is brought about by the difference in the radii of curvature rather than by the rate of curvature change. It should be noted that the rate of curvature change in one case is negative and in the other case it is positive.

Dissipation of impact energy by a metallic contoured body of the invention described herein is negligible due to the small internal damping of metals, unless the coils undergo plastic deformation. It is contemplated that an energy dissipating component be incorporated in the construction of the claimed device and system. Absorption of energy can be readily accomplished by embedding all or a portion of the contoured body in an elastomer such as rubber. It is also contemplated that the dispersing element be used in combination with highly dissipative materials such as rubber or other viscous materials or combination thereof.

It will be readily appreciated that even though the helical coils described in the Examples had circular cross-sections the shape of the cross-section can assume any random shape, for example, square, rectangular, hexagonal, with satisfactory results. It will also be appreciated that the contoured body of the invention does not have to be circular in contour; for example, a contoured body may be made up of straight sections bent at various points along its length. It should be fully understood that the dispersing body of this invention may be any body which brings about the propagation of Fourier components of the stress waves associated with the shock load at different velocities over a short distance.

What is claimed is:

1. A device for minimizing stress waves applied to a structure comprising:
    a body for dispersing stress waves, said dispersing body having
    a first end and a second end, at least one end being secured to a structure, the first end adapted to receive stress waves applied in the direction of dispersion of said stress waves through said second end and transmit the stress waves through said dispersing body and means for applying said stress waves in the direction of dispersion of said stress waves through said second end, said dispersing body constructed in such form and arranged in such manner that the surface boundary of said dispersing body causes the incident angle of the individual wave components of stress received to vary continuously over the distance of dispersion of said waves within said dispersing body.

2. The device of claim 1 wherein the impact energy receiving and stress wave dispersing body is a coil tangentially mounted on one end to said structure, the other end of said coil being available to receive any impact energy applied.

3. The device of claim 1 wherein said coil is a helical coil.

4. The device of claim 1 wherein the impact energy receiving and stress wave dispersing body comprises a plurality of coils each tangentially mounted on one end to said structure, the other end of said coils being available to receive any impact energy applied.

5. The device of claim 4 wherein said coils are helical coils.

6. The device of claim 1 wherein the stress wave dispersing body comprises a coil, and an impact receiving member, said coil being tangentially mounted between said structure and said receiving member.

7. The device of claim 6 wherein said coil is a helical coil.

8. The device of claim 1 wherein the stress dispersing body comprises a plurality of coils each tangentially mounted on one end to said structure and each tangentially mounted on its other end to an impact receiving member.

9. The device of claim 8 wherein said coils are helical coils.

10. The device of claim 1 wherein said receiving and dispersing body is a coil having a continuously varying radius.

11. The device of claim 6 wherein said coil is helical.

12. The method of dispersing individual Fourier components of stress waves associated with impact energy at different velocities over a short distance comprising transmission of said energy through a finite body of such shape and arranged in such manner that the incident angle of the individual wave component of said stress, at the surface boundary, of the body, varies continuously over the distance of dispersing.

13. In a system which is or may be subjected to a shock load, the method of minimizing the effect of a shock load to said system comprising transmission of said shock load through a finite body and dispersing the individual Fourier components of the stress waves associated with the shock load at different velocities over a short distance.

14. A shock isolation system comprising three components, two of said components being cooperatively joined by the third component wherein said system any shock load applied to either of said joined components is transmitted through said third component to the other component, said third component comprising a body of such construction that the individual Fourier components of the stress waves associated with said shock load transmitted therethrough are dispersed at different velocities over the transmission length of the body of said third component.

15. The shock isolation system of claim 14 wherein the third component is a tangentially loaded coil member.

16. The coil member of claim 15 wherein said coil has a continuously varying radius.

* * * * *